(12) United States Patent
Kent et al.

(10) Patent No.: US 8,049,740 B2
(45) Date of Patent: Nov. 1, 2011

(54) METHOD AND APPARATUS FOR LAPLACE CONSTRAINED TOUCHSCREEN CALIBRATION

(75) Inventors: Joel C. Kent, Fremont, CA (US); Robert J. Warmack, Knoxville, TN (US)

(73) Assignee: Tyco Electronics Corporation, Berwyn, PA (US)

( * ) Notice: Subject to any disclaimer, the term of this patent is extended or adjusted under 35 U.S.C. 154(b) by 981 days.

(21) Appl. No.: 11/925,264

(22) Filed: Oct. 26, 2007

(65) Prior Publication Data

US 2009/0109195 A1   Apr. 30, 2009

(51) Int. Cl.
*G06F 3/041* (2006.01)
(52) U.S. Cl. ............... 345/178; 345/173; 178/18.01; 178/18.02
(58) Field of Classification Search .......... 345/178
See application file for complete search history.

(56) References Cited

U.S. PATENT DOCUMENTS

| | | | |
|---|---|---|---|
| 4,456,787 A * | 6/1984 | Schlosser et al. ......... | 178/18.05 |
| 5,422,643 A * | 6/1995 | Chu et al. .................. | 341/141 |
| 5,686,705 A * | 11/1997 | Conroy et al. ............. | 178/18.05 |
| 5,751,276 A | 5/1998 | Shih | |
| 6,593,916 B1 | 7/2003 | Aroyan | |
| 6,650,319 B1 | 11/2003 | Hurst et al. | |
| 7,800,589 B2 * | 9/2010 | Hurst et al. ................. | 345/173 |
| 2003/0043116 A1 * | 3/2003 | Morrison et al. ........... | 345/158 |
| 2004/0113895 A1 * | 6/2004 | Lubarsky et al. ........... | 345/174 |

FOREIGN PATENT DOCUMENTS

| | | |
|---|---|---|
| JP | 2005/134992 | 5/2005 |
| WO | WO 9819283 A1 * | 5/1998 |

* cited by examiner

*Primary Examiner* — Richard Hjerpe
*Assistant Examiner* — Dorothy Harris

(57) ABSTRACT

A computer readable medium has instructions to calibrate a touch system by detecting touch points on a touchscreen that are each associated with touchscreen coordinates in a touchscreen coordinate system. The instructions associated each of the touch points with known calibration targets, and each of the calibration targets has display coordinates in a display coordinate system that is associated with at least one of a display screen and an operating system. The instructions fit the display coordinates and the touchscreen coordinates non-linearly with respect to each other based on a generalized Laplace-constrained fit that is used to identify correction parameters used to map a user generated run-time touch point on the touchscreen to a display coordinate location on a display screen. The correction parameters represent non-linear corrections.

19 Claims, 6 Drawing Sheets

METHOD AND APPARATUS FOR LAPLACE CONSTRAINED TOUCHSCREEN CALIBRATION

BACKGROUND OF THE INVENTION

This invention relates generally to touch display systems, and more particularly, to generating correction parameters used by algorithms to locate run-time touches on touch display systems.

Touch displays and touch display systems are provided for an increasing number of applications. Point of sale (POS), for processing transactions within a department store, and point of information (POI), such as an electronic directory are common. For example, applications include airport passenger and baggage check-in, and kiosks located within a store that provide information about products and services. Furthermore, touch displays are increasingly used in handheld computing applications such as for rental car check-in, package delivery services, and stockroom inventory management.

A touch display system has a display for visually presenting data to a user. A touchscreen is installed in front of the display. The user interacts with the system by touching the touchscreen at locations over software programmed buttons or icons in the displayed image or by moving a cursor via a moving touch. With the broad use of graphical user interfaces (GUI) such as Microsoft Windows® that provide many small buttons, menu selections, and the like, it is increasingly important for touchscreen measured locations to correspond with the desired cursor locations in the display image. A number of calibration methods have been developed to properly map touchscreen coordinates to display coordinates. As used herein, "touchscreen coordinate system" refers to coordinate locations detected as a result of a touch on the touchscreen, and "display coordinate system" refers to coordinate locations of points on the display. In practice, touchscreen software communicates coordinates to an operating system that has its own coordinate system that in turn is mapped to the coordinate locations of the points on the display. Therefore, the term "display coordinate system" is generalized herein to include operating system coordinate systems.

Linear and non-linear distortions may be present within the displays. Linear distortion may be one or more of horizontal and vertical offsets as well as scale change or magnification. An example of linear distortion is when equally spaced straight lines remain equally spaced straight lines. With non-linear distortion, equally spaced straight lines are distorted such that lines are no longer straight nor equally spaced, and may also have offset and scale distortions. For example, images on cathode ray tube (CRT) displays are subject to non-linear distortions. Today, however, flat panel displays with minimal non-linear distortion have largely replaced CRT displays and may include liquid crystal displays (LCDs), plasma displays, electroluminescent displays, and organic light-emitting diode (OLED) displays, etc. The discussion herein assumes that the display coordinate system is free of non-linear distortions.

Ideally, touchscreen hardware would be perfectly linear, generating x and y coordinates that differ from display coordinates by, at most, linear distortions. Even small touchscreen non-linear distortions may be a problem for GUI operation via a touch display system. Such non-linear distortions of raw touchscreen coordinates may be due to touchscreen manufacturing variations. Alternatively, the touchscreen may be non-linear by design as a consequence of other design objectives such as narrow borders or reduced manufacturing cost. Due to the non-linearities, there is demand for calibration methods to map non-linear touchscreen coordinates to linear display coordinates to assure that touches activate intended GUI icons.

There are many types of touchscreens that may be used in touch display systems. Touchscreen types include surface acoustic wave touchscreens, infrared touchscreens, capacitive touchscreens and 4-wire, 5-wire and 9-wire resistive touchscreens. 5-wire touchscreens are a common choice. The basic principles of 5-wire touchscreen operation and forming of the touchscreen substrate are described in the patent literature, such as in U.S. Pat. No. 6,593,916 (Elo Touchsystems, Inc., 2003).

In the construction of a typical 5-wire resistive touchscreen, a polymer film such as polyethylene terephthalate (PET) forms a coversheet that is placed over a glass substrate with a narrow air gap in between. In the absence of a touch, spacers prevent contact between the coversheet and glass substrate. The two surfaces facing the air gap are coated with transparent conductive coatings such as indium tin oxide (ITO). Associated electronics and interconnections alternately apply X and Y voltage gradients to the coating on the glass substrate. The coating on the coversheet is connected to voltage sensing circuitry. A touch causes the coversheet to deflect and contact the substrate thus making a localized electrical connection between the conductive coatings. As a result of this electrical contact, the local voltage on the glass substrate's coating is communicated to the coversheet coating which is connected to voltage sensing circuitry. One voltage is measured when an X voltage gradient is applied to the glass substrate's coating and another voltage is measured for a Y voltage gradient. These two voltages are the raw touch (x,y) coordinate data. The voltage gradients are not perfect and may lead or contribute to non-linear and/or linear distortions.

To form an exemplary 5-wire touchscreen substrate, a complex electrode geometry composed of discrete electrodes is fabricated around the perimeter of the glass substrate. Such 5-wire touchscreen designs may be referred to as discrete-electrode 5-wire resistive touchscreens or simply discrete-electrode touchscreens. Discrete electrode touchscreens have a discrete number of electrical connections to the resistive coating that covers the touch area. Very close to the perimeter of the touch area, the discreteness of these connections results in distortions of the lines of constant voltage. In contrast, well away from the perimeter, the lines of constant voltage can be straight and equally spaced and represent the ideal linear touchscreen. In some cases, in areas of a discrete-electrode touchscreen away from the perimeter, a small, yet undesirable, amount of non-linearity may be experienced.

An alternative 5-wire touchscreen may be referred to as a picture-frame touchscreen and is discussed in U.S. Pat. No. 6,650,319 (Elo Touchsystems, Inc., 2003). A resistive electrode in continuous contact with the resistive coating surrounds the touch area much like a picture frame surrounds a picture. The resistive picture-frame electrode results in curved lines of constant voltage or global bowing distortions. Picture-frame touchscreens are quite non-linear by design and depend on software correction of non-linearity. The picture-frame touchscreen design does provide a number of benefits including narrow borders as well as the elimination of the perimeter distortions seen in discrete-electrode touchscreen design.

Known methods exist for mapping touchscreen coordinates to display coordinates, such as 3-point calibration that may be used for linear mappings. More sophisticated calibration and mapping methods also exist that account for non-linear distortions within raw touchscreen coordinates.

U.S. Pat. No. 5,751,276 (Microsoft Corporation, 1998) proposes an alternate linear calibration method in which redundant data is collected and linear correction coefficients are determined from a least squares fit. With the addition of two more calibration constants, linear shear distortions and arbitrary rotations of the touchscreen coordinate system with respect to the display coordinate system can be corrected. However, it is still a linear correction scheme in which equally spaced straight lines remain equally spaced straight lines.

For many applications, 2-point or 3-point calibration is sufficient. This is often the case for applications that only involve user selection of large icons or touch buttons. However, other applications are more demanding, such as graphical user interfaces (GUI) that require precise cursor control to properly activate numerous small icons, buttons, scroll bars, etc. For such demanding applications, imperfections in the touchscreen hardware may lead to unacceptable non-linear distortions of the touch system coordinates that cannot be corrected with the linear 3-point calibration. Furthermore, if the touchscreen is non-linear by design, such as in a picture-frame touchscreen, the linear 3-point calibration method is insufficient.

Calibration methods involving more than three points that correct for non-linear distortions are also known. For example Japanese patent application publication 2005-134992 (application JP 2003-367561) of Gunze proposes a 9-point calibration scheme to determine coefficients of non-linear corrections for picture-frame touchscreens. 25-point calibration procedures are also used.

Turning to a 25-point calibration, let $(X_1, Y_1)$, $(X_2, Y_2)$, ... $(X_{25}, Y_{25})$ be the locations in the display coordinate system of 25 calibration targets imaged on the display device. The 25 calibration points may, for example, be arranged in a 5 by 5 grid. As used herein, (X,Y) are display system coordinates and (x,y) are touchscreen system coordinates. As the calibration targets are displayed one by one on the touch display, the user touches the calibration targets, resulting in measured touchscreen coordinates $(x_1, y_1)$, $(x_2, y_2)$, ... $(X_{25}, Y_{25})$. In mathematical notation, for calibration target index k=1, 2, ... 25, measured touchscreen coordinates $(x_k, y_k)$ correspond to display coordinates $(X_k, Y_k)$. Such calibration data is used to generate correction coefficients or parameters for run-time algorithms. The calibration targets may represent predetermined locations or calibration coordinates within the display coordinate system. Therefore, the calibration targets need not be displayed on a corresponding and/or attached display device. For example, during manufacturing an automated method may be used to touch the predetermined locations on the touchscreen prior to mounting the touchscreen and the display device together. Examples of automated methods include a stencil, a bed-of-nails, an activation device that is robotically controlled, and the like.

There are several options for extracting correction coefficients or parameters from the 25-point calibration data. For example the calibration data could be used to construct look-up table data to be used in combination with linear interpolation. Polynomial expansions are also used to generate mappings.

Polynomial expansions may be accomplished with respect to the center of the display. Let $(x_C, y_C)$ be the touchscreen coordinates generated by a touch at the center of the touch display. Third-order polynomial expansions for display coordinates (X,Y) in terms of touchscreen coordinates (x,y) are given by Equation (Eq.) 1 and 2 below. Each equation contains ten monomial terms each with its own coefficient for a total of twenty calibration constants $A_{0,0}$, $A_{1,0}$, $A_{0,1}$, $A_{2,0}$, $A_{1,1}$, $A_{0,2}$, $A_{3,0}$, $A_{2,1}$, $A_{1,2}$, $A_{0,3}$, $B_{0,0}$, $B_{1,0}$, $B_{0,1}$, $B_{2,0}$, $B_{1,1}$, $B_{0,2}$, $B_{3,0}$, $B_{2,1}$, $B_{1,2}$ and $B_{0,3}$. For example, polynomial coefficients may be computed from the calibration data $(X_k, Y_k)$ and $(x_k, y_k)$ for k=1 to 25.

$$X = A_{0,0} + A_{1,0} \cdot (x - x_C) + A_{0,1} \cdot (y - y_C) + \\ A_{2,0} \cdot (x - x_C)^2 + A_{1,1} \cdot (x - x_C) \cdot (y - y_C) + A_{0,2} \cdot (y - y_C)^2 + \\ A_{3,0} \cdot (x - x_C)^3 + A_{2,1} \cdot (x - x_C)^2 \cdot (y - y_C) + \\ A_{1,2} \cdot (x - x_C) \cdot (y - y_C)^2 + A_{0,3} \cdot (y - y_C)^3 \quad \text{Eq. 1}$$

$$Y = B_{0,0} + B_{0,1} \cdot (x - x_C) + B_{0,1} \cdot (y - y_C) + \\ B_{2,0} \cdot (x - x_C)^2 + B_{1,1} \cdot (x - x_C) \cdot (y - y_C) + B_{0,2} \cdot (y - y_C)^2 + \\ B_{3,0} \cdot (x - x_C)^3 + B_{2,1} \cdot (x - x_C)^2 \cdot (y - y_C) + \\ B_{1,2} \cdot (x - x_C) \cdot (y - y_C)^2 + B_{0,3} \cdot (y - y_C)^3 \quad \text{Eq. 2}$$

For convenience, Eq. 3 and 4 assume that the touchscreen coordinates have been offset to move the origin to the center, that is, $x_C=0$ and $y_C=0$. The general offset case may be returned to by the substitutions $x \to (x-x_C)$ and $y \to (y-y_C)$.

$$X = A_{0,0} + A_{1,0} \cdot x + A_{0,1} \cdot y + A_{2,0} \cdot x^2 + A_{1,1} \cdot xy + A_{0,2} \cdot y^2 + \\ A_{3,0} \cdot x^3 + A_{2,1} \cdot x^2 y + A_{1,2} \cdot xy^2 + A_{0,3} \cdot y^3 \quad \text{Eq. 3}$$

$$Y = B_{0,0} + B_{1,0} \cdot x + B_{0,1} \cdot y + B_{2,0} \cdot x^2 + B_{1,1} \cdot xy + B_{0,2} \cdot y^2 + \\ B_{3,0} \cdot x^3 + B_{2,1} \cdot x^2 y + B_{1,2} \cdot xy^2 + B_{0,3} \cdot y^3 \quad \text{Eq. 4}$$

The notation may be further simplified by using $\Sigma$ summation notation where N=3 for the $3^{rd}$ order polynomial expansion of Eq. 3 and 4.

$$X = \sum_{m \geq 0, n \geq 0}^{m+n \leq N} A_{m,n} \cdot x^m \cdot y^n \quad \text{Eq. 5}$$

$$Y = \sum_{m \geq 0, n \geq 0}^{m+n \leq N} B_{m,n} \cdot x^m y^n \quad \text{Eq. 6}$$

Eq. 5 and 6 generalize to polynomial expansions of different orders depending on the value of N. For example, for values of N of 3, 5 and 7, the number of terms in each of the above equations is 10, 21 and 36 respectively. For a $7^{th}$ order expansion, the total number of calibration constants $A_{m,n}$ and $B_{n,m}$ is 2*36=72, exceeding the number (2*25=50) of measured values $x_k$ and $y_k$ (k=1 to 25) from the 25-point calibration process. In contrast, the number of constants for $5^{th}$ and lower order polynomial expansions is less than the number of 25-point calibration measurements.

The polynomial coefficients $A_{m,n}$ and $B_{n,m}$ may be determined by doing a least squares fit. For any proposed set of polynomial coefficients $A_{m,n}$ and $B_{n,m}$, one may compute the difference between $X_k$, the known X coordinate of calibration target k used to display the calibration target, and the value of X computed above for the corresponding measured touchscreen coordinates $(x_k, y_k)$. The discrepancy between actual and computed horizontal coordinates may be notated as $\Delta X_k$ and given by Eq. 7. $\Delta Y_k$ may be similarly defined.

$$\Delta X_k = X_k - \sum_{m \geq 0, n \geq 0}^{m+n \leq N} A_{m,n} \cdot x_k^m \cdot y_k^n \quad \text{Eq. 7}$$

The polynomial coefficients $A_{m,n}$ and $B_{n,m}$ may be determined by minimizing the sum of squares (SS) of Eq. 8, namely minimizing the SS of the discrepancies. (As the first sum depends only on the parameters $A_{m,n}$ and the second sum only on the parameters $B_{n,m}$, each sum can be minimized separately with the same result.) Algorithms and code for such least squares fits are well known and widely available.

$$SS = \sum_{k=1}^{25}(\Delta X_k)^2 + \sum_{k=1}^{25}(\Delta Y_k)^2 \qquad \text{Eq. 8}$$

This method for determining polynomial coefficients that are used to calibrate the mapping between touchscreen coordinates (x,y) and display coordinates (X,Y) may be referred to as a conventional general polynomial fit to $N^{th}$ order. Herein the conventional general polynomial fit may also be referred to as a conventional general fit. A conventional general polynomial fit to $1^{st}$ order is a linear fit. A $3^{rd}$ order conventional general polynomial fit is often sufficient to correct for slight bowing or pin-cushion non-linearities due to manufacturing variations of a nominally linear touchscreen design. Higher order polynomial fits are desirable to handle stronger non-linearities such as those of picture-frame touchscreens. The 25-point calibration process based on a conventional general polynomial fit is more powerful than the common 3-point linear calibration method but still has limitations.

In the conventional general polynomial fit, display coordinates (X,Y) are represented as polynomial expansions of the touchscreen coordinates (x,y). Such expansions are directly usable by run-time code that receives raw touchscreen coordinates (x,y) as input and generates display coordinates (X,Y) as output. Parameters from the polynomial fit, such as the monomial coefficients $A_{m,n}$ and $B_{n,m}$, may be directly stored by the calibration process for later use by run-time code during operation of the touch display system.

The conventional general polynomial fit severely limits the maximum order of the polynomial expansion. For example, to keep the number of calibration constants smaller than the number of measurements from a 25-point calibration grid, the order of the polynomial expansion must be no larger than five, that is, $N \leq 5$. Increasing the calibration grid to, for example, 9×9 results in a total of 2*81=162 measured values and may allow expansions up to order N=11. However, with a 9×9 calibration grid each of the 81 calibration targets must be touched.

The above assumes that the calibration targets are touched with perfect accuracy, which is almost never the case. Measured calibration data $(x_k, y_k)$ are subject to electronic noise. Additionally, imprecise activation of touch calibration target locations may also result in noise. With noisy data, having a greater number of fit parameters can result in a worse fit. In general, fits with high degrees of redundancy (many more data points than fit parameters) filter measurement noise while fits with low degrees of redundancy (number of data points not much larger than or equal to the number of fit parameters) amplify measurement noise particularly when extrapolating beyond the data range.

For a least squares fit of a polynomial expansion to 25-point calibration data, there are 25 x measurements and 25 y measurements for a total of 50 measured values. For the $3^{rd}$ order polynomial expansion discussed above, there are 10 fit parameters $A_{m,n}$ and 10 fit parameters $B_{n,m}$ for a total of 20 fit parameters. For 25-point calibration the redundancy is high (50 is much larger than 20) and the fitting process statistically averages out much of the calibration measurement noise. In contrast, for a $5^{th}$ order polynomial expansion, there are 21 $A_{m,n}$ parameters and 21 $B_{n,m}$ parameters for a total of 42. For 25-point calibration the redundancy is low (50 is not much larger than 42) and the fit makes poor predictions particularly when extrapolating to locations outside the 5×5 grid. Hence in practice, even $5^{th}$ order is problematic for a conventional general polynomial fit to 25-point calibration data.

For picture-frame touchscreens, the 5×5 calibration grid can be expanded to be essentially the same size as the touch sensitive touch area. This eliminates the need to extrapolate to locations outside the calibration grid where conventional general polynomial fits tend to be most problematic. In contrast, for discrete-electrode touchscreens, the perimeter of the touch area is subject to complex local distortions as discussed above. The local distortions further add to the noise level of the touchscreen coordinates. To avoid this additional source of noise, all 5×5 calibration targets are positioned away from the perimeter and thus create a need for reliable extrapolation outside the 5×5 calibration grid.

Therefore, a need exists for an improved calibration method for touch display systems.

BRIEF DESCRIPTION OF THE INVENTION

In one embodiment, a method for calibrating a touch system comprises defining a set of calibration targets that have associated display coordinates $(X_i, Y_i)$ that are in a display coordinate system. Touchscreen coordinates $(x_i, y_i)$ that have noise are accepted. Each of the touchscreen coordinates $(x_i, y_i)$ is associated with one of the calibration targets and the touchscreen coordinates are in a touchscreen coordinate system. Non-linear correction parameters are computed based on the touchscreen coordinates $(x_i, y_i)$ with respect to the display coordinates $(X_i, Y_i)$. The non-linear correction parameters define a one-to-one correspondence between display coordinates (X,Y) and touchscreen coordinates (x,y) that is non-linear. The computing produces the one-to-one correspondence where an average magnitude of a Laplacian of at least one of x and y touchscreen coordinates with respect to the display coordinates is smaller than an average magnitude of a Laplacian of a one-to-one correspondence of a conventional general fit computed in the presence of the noise of the touchscreen coordinates $(x_i, y_i)$. The Laplacians of the x and y touchscreen coordinates are based on $\partial^2/\partial X^2 + \partial^2 x/\partial Y^2$ and $\partial^2 y/\partial X^2 + \partial^2 y/\partial y^2$, respectively.

In another embodiment, a computer readable medium for calibrating a touch system comprises instructions to detect touch points on a touchscreen. The touch points each are associated with touchscreen coordinates in a touchscreen coordinate system. The computer readable medium also comprises instructions to associate each of the touch points with known calibration targets. Each of the calibration targets has display coordinates in a display coordinate system that is associated with at least one of a display screen and an operating system. The computer readable medium further comprises instructions to fit the display coordinates and the touchscreen coordinates non-linearly with respect to each other based on a generalized Laplace-constrained fit that is used to identify correction parameters used to map a user generated run-time touch point on the touchscreen to a display coordinate location on a display screen. The correction parameters represent non-linear corrections.

In yet another embodiment, a computer readable medium for calibrating a touch system comprises instructions to detect calibration touch points on a touchscreen. The touch points each are associated with touchscreen coordinates in a touchscreen coordinate system. The computer readable medium further comprises instructions to associate each of the touch points with known calibration targets that have display coordinates in a display coordinate system that is associated with a display screen. The calibration targets form an outline in the display coordinate system. The computer readable medium also comprises instructions to fit the display coordinates and the touchscreen coordinates non-linearly with respect to each other. The fit is used to identify correction parameters used to map touch points on the touchscreen to display coordinate locations on the display screen.

DETAILED DESCRIPTION OF THE INVENTION

Figure 1:
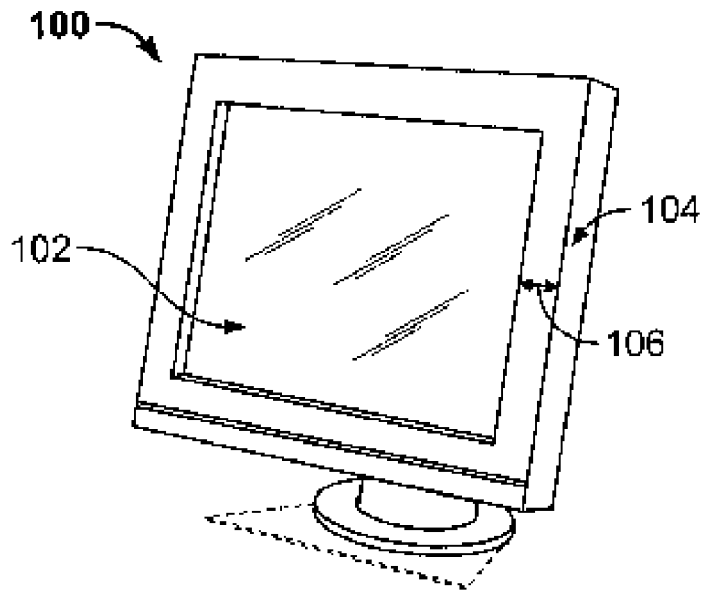
FIG. 1 illustrates a touch display formed in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, stored as instructions on a computer readable medium, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 5:
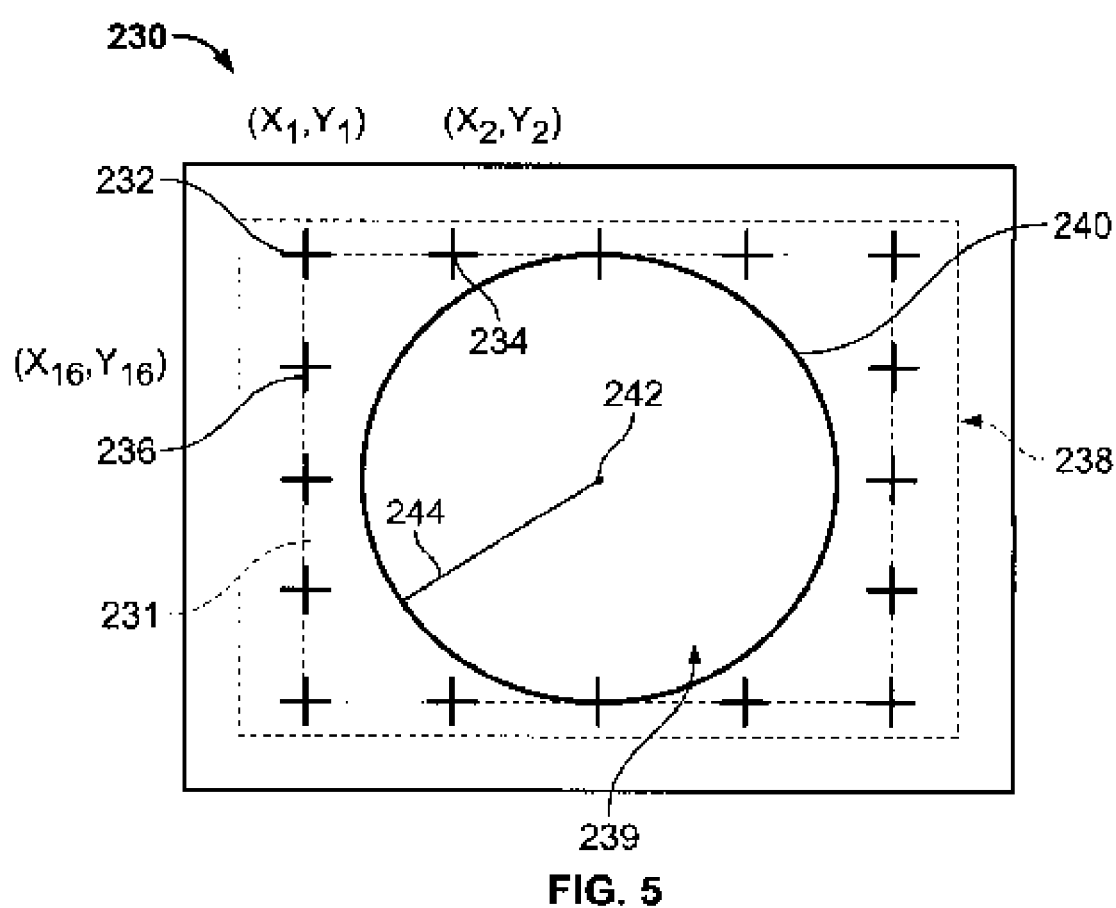
FIG. 5 illustrates a calibration grid having calibration targets that form an outline in accordance with an embodiment of the present invention.

Use of generalized Laplace constrained fits as discussed herein provide a number of benefits relative to conventional general fits as a way to interpolate and extrapolate from calibration data to a complete one-to-one correspondence between any display coordinate (X,Y) and any touchscreen coordinate (x,y). For a given set of calibration targets, such as a 5 by 5 calibration target grid, and relative to conventional general fits, generalized Laplace constrained fits improve the interpolation between the locations of the calibration targets and improve extrapolation beyond the calibration targets. These improvements result from the use of the laws of physics to reduce the number of independent fit parameters. A reduced number of fit parameters increases the redundancy of the fit process and hence increases the ability of the fit to statistically average out calibration data errors due to various sources of noise. Use of generalized Laplace constrained fits results in better calibration parameters for a given number of calibration targets, or alternately, allows equally good or better calibration parameters from a reduced number of calibration targets. One example of the latter is the case in which all interior targets are removed from a 5 by 5 grid (as shown in FIG. 5), reducing the number of targets from 25 to 16. In this case, even with only small amounts of calibration data noise, a conventional general fit interpolates to the center of the touchscreen in an erroneous fashion while a generalized Laplace fit interpolates accurately to the touchscreen center.

FIG. 1 illustrates a touch display 100 in accordance with an embodiment of the present invention. The touch display 100 may be other sizes and shapes. The touch display 100 may be installed on a desk, a wall, or within a kiosk, for example, or similar construction may used to form a hand-held device such as a personal digital assistant (PDA).

The touch display 100 comprises a touchscreen 102 and a display housing 104. The touchscreen 102 is installed over a display screen (not shown). The display housing 104 may have a bezel width 106 extending over outer edges of the touchscreen 102 and the display screen.

Figure 2:
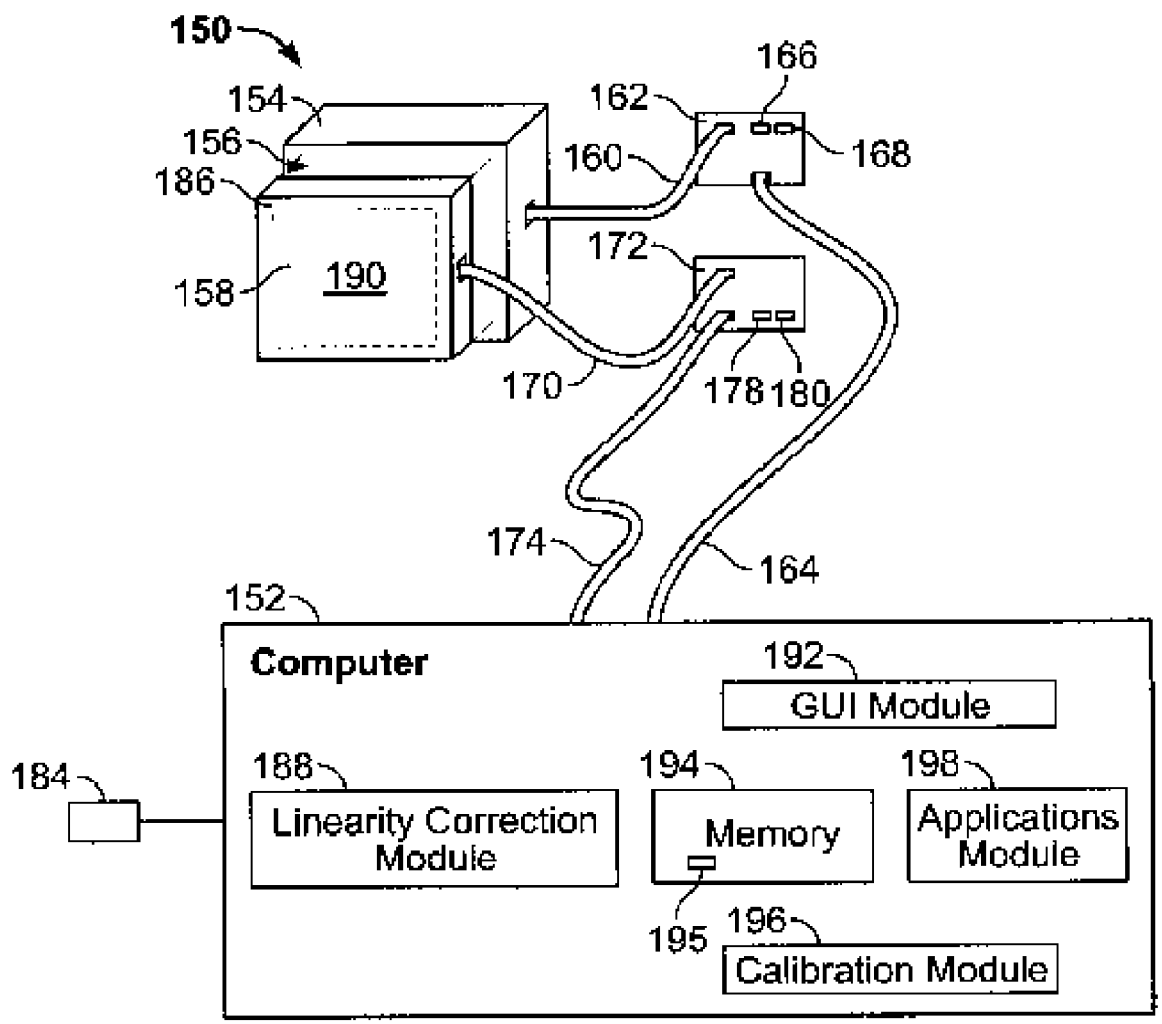
FIG. 2 illustrates a block diagram of a touch display system formed in accordance with an embodiment of the present invention.

FIG. 2 illustrates a block diagram of a touch display system 150 having a touch display 154 interconnected with a computer 152. The touch display 154 comprises components for displaying data on a display screen 156. The display screen 156 may be an LCD, CRT, Plasma, OLED display, photographic image and the like. A touchscreen 158 is installed over the display screen 156 and receives input from a user via a finger touch, a stylus, and the like.

The computer 152 may include one or more of a linearity correction module 188, a GUI module 192, a memory 194, a calibration module 196 and one or more run-time applications in an applications module 198. The computer 152 may be used for acquiring non-linear correction parameters and/or calibration constants. The computer 152 may also apply the correction parameters and calibration constants during run-time to identify locations of user touch events. In one embodiment, the computer 152 may be used during the initial calibration of the touch display system 150, such as during manufacture and/or assembly of the system 150. In another embodiment, the computer 152 may be used to initially calibrate the touchscreen 158 prior to installing the touchscreen 158 and the display screen 156 together. In yet another embodiment, the computer 152 may be used to run one or more run-time applications, such as in a retail store, a restaurant, a factory for product testing, a medical facility and the like, and may optionally have the capability of acquiring new correction parameters. For example, new correction parameters may be needed if one or more components affecting linearity were replaced in the touch display system 150. In addition to the touch display 154, the computer 152 may comprise an alternate user input 184 such as a keyboard and/or a mouse. Although indicated separately, the components of the touch display system 150 may be within a single unit, such as a PDA or other portable device.

A display cable 160 connects the touch display 154 with a display controller 162. The display controller 162 receives video information from the computer 152 over video cable 164. The video information is received and processed by the display controller 162, then transferred to the touch display 154 over the display cable 160 for display on the display screen 156. The touch display 154 and the display controller 162 may be hardwired together or interconnected such that the display cable 160 is not required. The display controller 162 comprises components such as a CPU 166 and a memory 168.

A touchscreen cable 170 interconnects the touchscreen 158 with a touchscreen controller 172. The touchscreen controller 172 sends and receives information to and from the computer 152 over touch data cable 174. Touch information is received by the touchscreen 158, transferred over the touchscreen cable 170 to the touchscreen controller 172, and then sent over the touch data cable 174 to the computer 152. The touchscreen controller 172 comprises components such as a CPU 178 and memory 180.

A display housing (not shown) may enclose the touch display 154, the display and touchscreen cables 160 and 170, and the display and touchscreen controllers 162 and 172. As discussed in FIG. 1, the display housing may enclose an outer edge portion of the touchscreen 158, securing the touchscreen 158 and/or covering fasteners that secure the touchscreen 158 to the display screen 156. The video and touch data cables 164 and 174 may be separate cables or packaged together. The video and touch data cables 164 and 174 may extend from the display housing to the location of the computer 152. Optionally, the display housing may be a cover for a PDA or other small hand-held or portable device that may or may not hold the computer 152 there-within. Also, the touch data cable 174 and video cable 164 may be replaced by wireless technology.

In some embodiments, an outer edge portion or perimeter of the touchscreen 158 may be designed as a dead region 186 to avoid false touches from the bezel contact on the surface of the touchscreen 158. For example, in typical resistive touchscreens, the dead region 186 may extend slightly beyond the bezel towards the center of the touchscreen 158 to avoid false touches due to bezel contact. Touch area 190 detects touch events and may extend across the entire touchscreen 158 or to edges of the dead region 186.

The term "linearity" describes the ability of the touch display system 150 to correctly map touch event coordinates that are in a touchscreen coordinate system with the actual coordinates of the underlying display image that are in a display coordinate system. To achieve good linearity, the touchscreen 158 is calibrated prior to run-time touch operation. In one embodiment, the calibration module 196 may display a set of calibration targets on the display screen 156. For example, in the 25-point calibration process, the user is asked to touch each calibration target within a 5×5 grid of displayed calibration targets. In another embodiment, the calibration module 196 may define the set of calibration targets that are the used by an automated process, such as when the touchscreen 158 is calibrated separate from the display screen 156. The calibration module 196 generates a one-to-one correspondence between the touch event coordinates and the display coordinates and stores calibration data such as non-linear correction parameters, calibration constants and/or coefficients that may be stored in the memory 194 and used during run-time by the linearity correction module 188.

During run-time, one or more applications within the applications module 198 may be used with the GUI module 192 to display desired images on the display screen 156. The Microsoft Windows® operating system is one example of a GUI module 192. The linearity correction module 188 detects the user touch points and uses the previously generated correction parameters stored in the memory 194 to correlate the user touch points to cursor positions on the display screen 156, ensuring that the reaction of the touch display system 150 is linear. Coordinates of the user touch point, corrected for touchscreen non-linearity using the previously determined parameters, are passed to the GUI module 192. The GUI module 192 determines whether the coordinates indicate a selection of a GUI button or icon. If a GUI button is selected, the computer 152 may take further action based on the functionality associated with the particular GUI button.

Although illustrated as separate modules, the functionality of the linearity correction module 188, GUI module 192, calibration module 196 and applications module 198 may be accomplished by a single portion of firmware or software, stored as instructions on a computer readable medium (not shown) within and/or interconnected with the computer 152. Optionally, instructions to accomplish functions of the modules 188, 192, 196 and 198, alone or together, may be stored within one or more modules of firmware or software. Optionally, modules 188, 194 and 196 may be located in touchscreen controller 172.

As discussed previously, the conventional general polynomial fit method may require more fit parameters than may be supported by the set of calibration targets. In other words, when the conventional general polynomial fit method uses higher order polynomials to determine the coefficients, such as by going to $5^{th}$ or $7^{th}$ order polynomials, the number of fit parameters may either exceed the numbers of measured quantities or may result in insufficient redundancy for reliable interpolation and extrapolation. Not all polynomials allowed by a conventional general fit obey the laws of physics (such as Ohm's Law and Kirchhoff's Junction Rule). Thus there is an opportunity to greatly reduce the number of fit parameters by eliminating some or all of the fit parameters that do not obey the laws of physics, and hence provide fits to calibration data with much improved reliability and accuracy.

Figure 3:
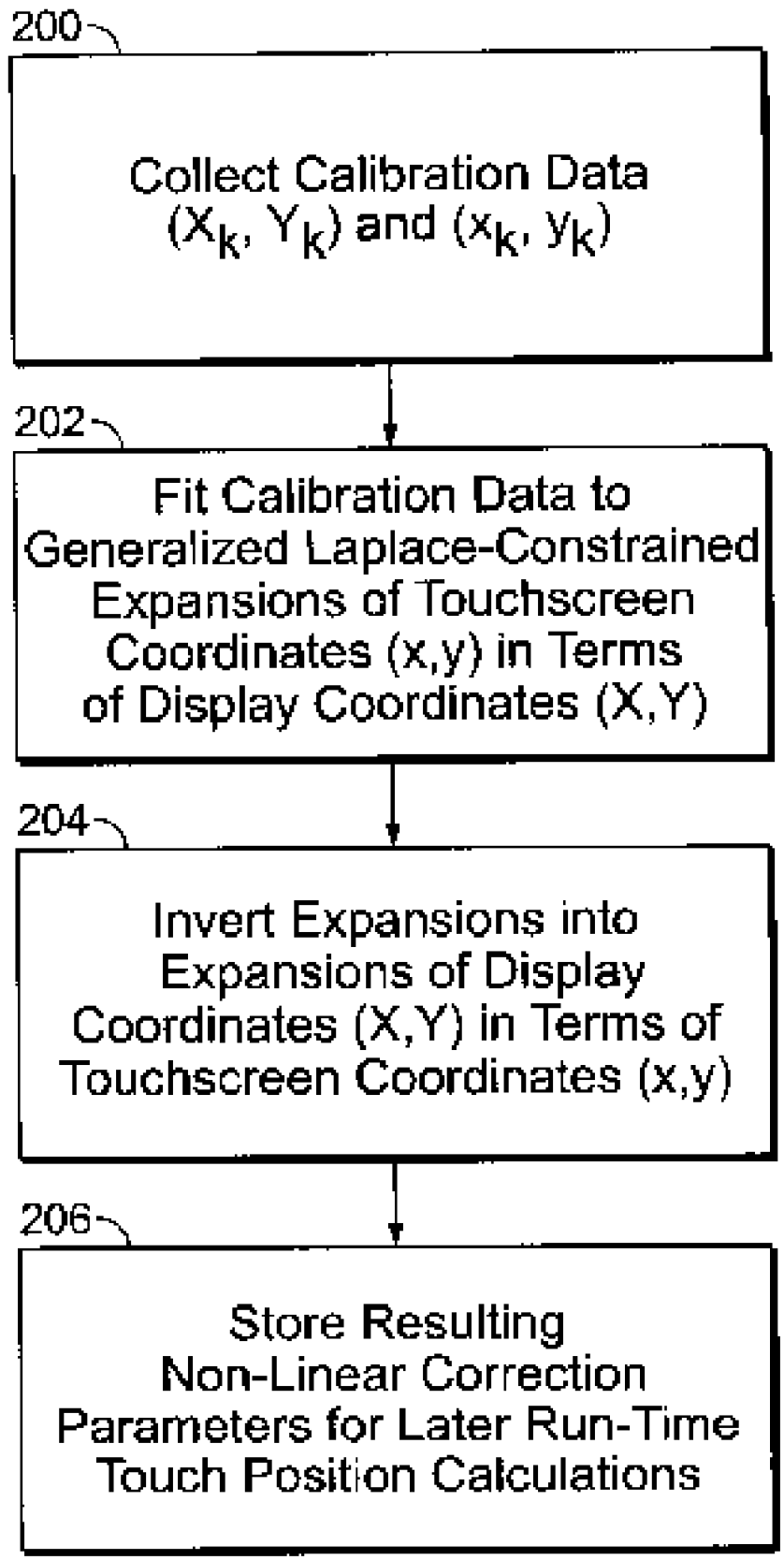
FIG. 3 illustrates a method of generating non-linear correction parameters that are based on a generalized Laplace-constrained fit method in accordance with an embodiment of the present invention.

FIG. 3 illustrates a method of generating non-linear correction parameters that are based on a generalized Laplace-constrained fit method. The non-linear correction parameters describe a unique one-to-one correspondence between the display coordinates (X,Y) and the touchscreen coordinates (x,y). Herein, the term "Laplace-constrained fit" includes at least fits that apply to symmetric, quasi-symmetric and non-symmetric touchscreens 158, as well as polynomial fits and Laplace-constrained fits that do not violate the laws of physics when applied to a uniform resistive coating. The term "quasi-symmetric" may be used to refer to a touchscreen 158 that is symmetric in construction but is mounted with a tilt and/or offset with respect to the display screen 156. The term "generalized Laplace-constrained fit" includes at least the Laplace-constrained fits as well as fits that may have a small increase in the number of fit parameters (compared to the Laplace-constrained fit) in order to account for non-uniformity of the resistive coating and perhaps other physical effects not accounted for in Laplace's equation.

Mathematically, the Laplace-constrained fit constrains the expansion, which in some cases may be a polynomial expansion, to obey the laws of physics and an assumption of resistive coating uniformity by considering only terms that satisfy Laplace's equation. The Laplace-constrained fit reduces the effects of noise in the calibration process (such as electronic noise, inaccurate selection of the calibration target location and local distortions), allows higher order polynomial expansions (such as $7^{th}$ order), extrapolates more reliably outside the calibration grid and allows a reduction in the number of calibration targets that need to be touched. Therefore, compared to the conventional general fit, the Laplace-constrained fit reduces the fit parameters and results in a better fit with the same data or a comparable fit with less data.

The improvements of the Laplace-constrained fit are also realized by the generalized Laplace-constrained fit in which the number of fit parameters is modestly increased (compared to the Laplace-constrained fit) to account for resistive coating non-uniformity and perhaps other physical effects not accounted for in Laplace's equation. The generalized Laplace-constrained fit also has a reduced number of fit parameters compared to the conventional general fit.

At 200, the calibration module 196 (as shown in FIG. 2) collects calibration data. As was defined previously, (X,Y) indicates display coordinates and (x,y) indicates touchscreen coordinates that are detected based on a user touch. The display coordinates (X,Y) may also be referred to as calibration coordinates that are associated with the display screen 156 and/or the operating system within the GUI module 192. Therefore, the use of display coordinates (X,Y) is not limited to applications in which a display screen 156 is presently displaying the associated calibration targets.

Initially, the 25-point calibration data based on a 5×5 grid of calibration targets will be discussed. The calibration module 196 displays calibration targets that have a corresponding set of display coordinates (X,Y) on the display screen 156 and detects user generated touch points that have a corresponding set of touchscreen coordinates (x,y). The touchscreen coordinates (x,y) may be associated with a touchscreen coordinate system and the display coordinates (X,Y) may be associated with a display coordinate system that is different than the touchscreen coordinate system. In another embodiment, the calibration data need not be limited to a 5×5 grid and may be collected for a different number of calibration targets such as sixteen calibration targets in a 4×4 grid or 108 calibration targets in a 9×12 grid. In yet another embodiment, the touchscreen 158 may be calibrated prior to being mounted on the display screen 156. In this example, the display coordinates (X,Y) of each calibration target, also referred to as calibration coordinates, are known and the touchscreen coordinates (x,y) may be generated in an automated environment. Many other arrangements of calibration targets are possible. However, by enabling more reliable interpolation and extrapolation over larger distances, the Laplace-constrained fit method allows use of calibration grids with fewer calibration targets.

At 202, the calibration module 196 fits the calibration data to generalized Laplace-constrained expansions of the touchscreen coordinates (x,y) in terms of the display coordinates (X,Y). In one embodiment, a Laplace-constrained fit process involves a polynomial expansion of the touchscreen coordinates (x,y) in terms of the display coordinates (X,Y). Thus, the output of 202 is a set of fit parameters that defines a mapping from display coordinates (X,Y) to touchscreen coordinates (x,y). This mapping is in the opposite or inverse direction compared to the conventional general fit that maps touchscreen coordinates (x,y) from finger touches to display coordinates (X,Y) used by the operating system.

The GUI module 192 and applications module 198 operate based on display coordinates (X,Y). Therefore, at 204 the calibration module 196 inverts generalized Laplace-constrained expansions of touchscreen coordinates (x,y) in terms of display coordinates (X,Y) into expansions of the display coordinates (X,Y) in terms of the touchscreen coordinates (x,y).

The polynomial expansions below express touchscreen coordinates (x,y) in terms of display coordinates (X,Y). Also, α and β are used instead of A and B, indicating mapping from display to touchscreen coordinates. In contrast to the 20 independent fit parameters of a $3^{rd}$ order conventional general fit as shown in Eq. 1 and 2, Eq. 9 and 10 have only 14 fit parameters $\alpha_{X,0}$, $\alpha_{X,1}$, $\beta_{X,1}$, $\alpha_{X,2}$, $\beta_{X,2}$, $\alpha_{X,3}$, $\beta_{X,3}$, $\alpha_{Y,0}$, $\alpha_{Y,1}$, $\beta_{Y,1}$, $\alpha_{Y,2}$, $\beta_{Y,2}$, $\alpha_{Y,3}$ and $\beta_{Y,3}$ $$x = \alpha_{X,0}\cdot 1 + \alpha_{X,1}\cdot X + \beta_{X,1}\cdot Y + \alpha_{X,2}\cdot(X^2 - Y^2) + \beta_{X,2}\cdot 2XY + \alpha_{X,3}\cdot(X^3 - 3XY^2) + \beta_{X,3}\cdot(3X^2Y - Y^3) \quad \text{Eq. 9}$$

$$y = \alpha_{Y,0}\cdot 1 + \alpha_{Y,1}\cdot X + \beta_{Y,1}\cdot Y + \alpha_{Y,2}\cdot(X^2 - Y^2) + \beta_{Y,2}\cdot 2XY + \alpha_{Y,3}\cdot(X^3 - 3XY^2) + \beta_{Y,3}\cdot(3X^2Y - Y^3) \quad \text{Eq. 10}$$

Associated with each coefficient is a polynomial term that satisfies Laplace's equation (as will be explained later). The polynomials 1, X, Y, $(X^2-Y^2)$, 2XY, $(X^3-3X^2Y)$ and $(3XY^2-Y^3)$ are a complete list to $3^{rd}$ order of Laplace-constrained polynomials in the sense that any other $3^{rd}$ order polynomial satisfying Laplace's equation is a linear combination of these seven polynomials. $X^2$ is an example of a polynomial that does not satisfy Laplace's equation and is hence eliminated from consideration by the seven-parameter expansions. $Y^2$ is also a polynomial that does not satisfy Laplace's equation; however, $X^2-Y^2$ does satisfy Laplace's equation and is equivalent to having a term $X^2$ with a fitted coefficient α and also having a term $Y^2$ with no additional fit parameter but rather a coefficient set to −α. For example, the fourth term of Eq. 9 is $\alpha_{X,2}\cdot(X^2-Y^2)$. Thus for every power k only four coefficients are allowed, two for x, namely $\alpha_{X,k}$ and $\beta_{X,k}$, and two for y, namely $\alpha_{Y,k}$ and $\beta_{Y,k}$. Therefore, for polynomial expansions greater than $1^{st}$ order the Laplace-constrained fit reduces the number of fit parameters. The higher the order, the more dramatic is the reduction.

Returning to 204, the calibration module 196 inverts the generalized Laplace-constrained expansions (in this case Eq. 9 and 10) to produce expansions for display coordinates (X,Y) in terms of touchscreen coordinates (x,y), as is needed by the run-time algorithms during normal operation of the touch display system 150. One method of inversion is to use an expanded virtual calibration grid generated by using a Laplace-constrained fit to the measured calibration data. Other methods, such as algebraic expressions discussed later, may also be used and may be referred to herein as "analytic method".

Figure 4:
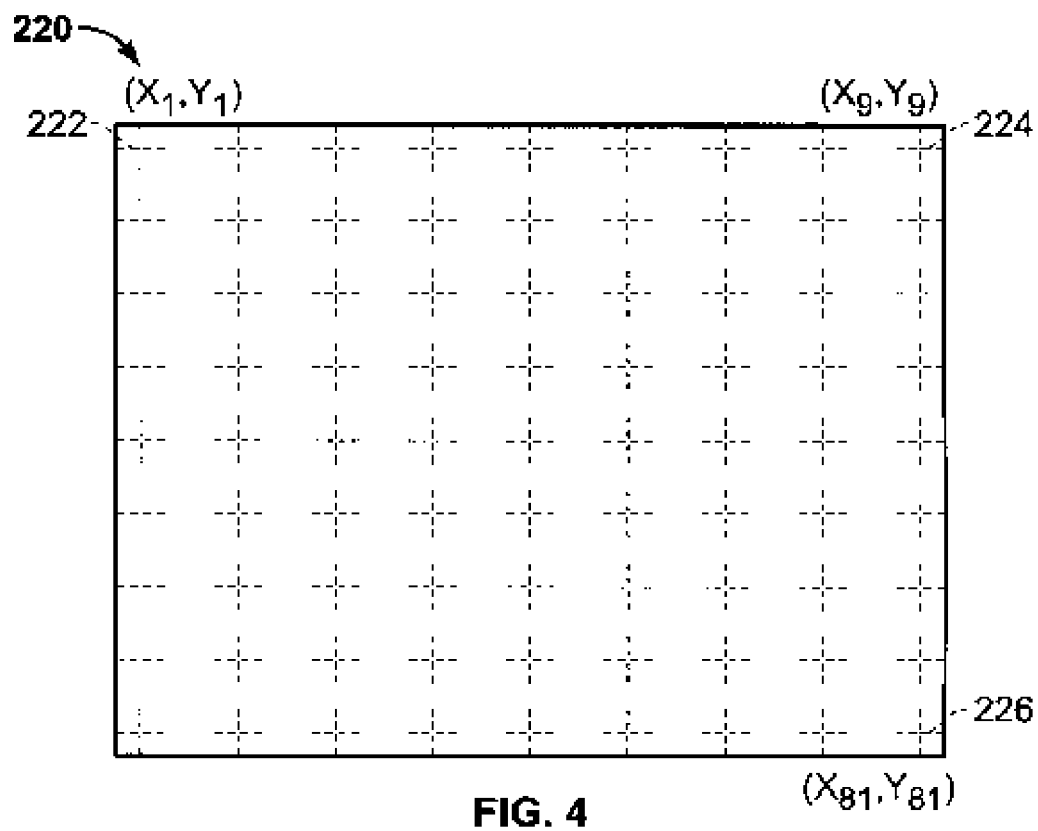
FIG. 4 illustrates a virtual calibration grid formed in accordance with an embodiment of the present invention.

FIG. 4 illustrates a 9×9 virtual calibration grid 220 with target index k'=1, 2, . . . 81 and calibration target display coordinates $(X_{k'}, Y_{k'})$. A first calibration target 222 corresponds to display coordinates $(X_1, Y_1)$, a ninth calibration target 224 corresponds to display coordinates $(X_9, Y_9)$, and an eighty-first calibration target 226 corresponds to display coordinates $(X_{81}, Y_{81})$.

Once the Laplace-constrained fit parameters $\alpha_{X,0}$, $\alpha_{X,1}$, $\beta_{X,1}$, . . . $\beta_{Y,3}$ have been determined at 202 of FIG. 3 using measured calibration data $(x_k, y_k)$ where k=1, 2, . . . 25, at 204 the calibration module 196 may use Eq. 11 and 12 below to predict "virtual" calibration data $(x_{k'}, y_{k'})$ where k'=1, 2, . . . 81. It would be undesirable for the user to have to activate such a large number of calibration targets. However, the creation of the virtual calibration data $(x_{k'}, y_{k'})$ is a computational step with no action required by the user, and larger or smaller virtual grids may be used. For example, a very large calibration grid may generate results that may be used to populate a look-up table.

$$x_k = \alpha_{X,0} \cdot 1 + \alpha_{X,1} \cdot X_k + \beta_{X,1} Y_k + \alpha_{X,2} \cdot (X_k^2 - Y_k^2) \\ + \beta_{X,2} \cdot 2 X_k Y_k + \alpha_{X,3} \cdot (X_k^3 - 3 X_k Y_k^2) + \beta_{X,3} \cdot (3 X_k^2 Y_k - Y_k^3)$$ Eq. 11

$$Y_k = \alpha_{Y,0} \cdot 1 + \alpha_{Y,1} \cdot X_k + \beta_{Y,1} \cdot Y_k + \alpha_{Y,2} \cdot (X_k^2 - Y_k^2) + \\ \beta_{Y,2} \cdot 2 X_k Y_k + \alpha_{Y,3} \cdot (X_k^3 - 3 X_k Y_k^2) + \beta_{Y,3} \cdot (3 X_k^2 Y_k - Y_k^3)$$ Eq. 12

Once the virtual calibration data is generated for a relatively larger virtual grid, the calibration module 196 computes non-linear correction parameters, such as with a least squares fit as described for the conventional general polynomial fit in Eq. 1 and 2. In this example, the coefficients are polynomial coefficients, such as coefficients $A_{m,n}$ and $B_{m,n}$. Using the generalized Laplace-constrained fit method of FIG. 3, the problems associated with prior art conventional general fits are avoided because the virtual calibration data for a large virtual calibration grid that fills the touch area 190 provides the least squares fit with a high degree of redundancy and there is no extrapolation outside the data range.

At 206, the calibration module 196 stores in the memory 194 the resulting non-linear correction parameters 195, for example coefficients $A_{m,n}$ and $B_{m,n}$ for use in run-time touch position calculations. Other representations and formats of non-linear correction parameters may be used, such as monomial coefficients and/or look-up table(s), as well as other mapping schemes, correlating touchscreen coordinates to display coordinates. The non-linear correction parameters describe the unique one-to-one correspondence between the display coordinates and the touchscreen coordinates that satisfies Laplace's equation or only approximately satisfies Laplace's equation to account for non-uniformity of the resistive coating and/or other physical effects.

Additionally, the calibration module 196 may store additional coefficients and/or parameters that may be used to apply additional non-linear or linear corrections. By way of example only, the touchscreen 158 may be calibrated prior to be attached to the display screen 156. Therefore, the generalized Laplace-constrained fit parameters are known. An additional calibration, such as a 3-point calibration, may be accomplished by displaying three calibration targets on the display screen 156 to determine coordinate offsets and rotational error between the touchscreen 158 and the display screen 156. In another embodiment, coordinate offsets and rotational error may be known prior to mounting the touchscreen 158 and the display screen 156 together, resulting from processes during manufacturing and calibration.

The generalized Laplace-constrained fit creates calibration options that are not possible with a conventional general polynomial fit. Previous fits, for example, needed interior calibration points. FIG. 5 illustrates a calibration grid having calibration targets that form an outline 231 within the touch area of the display coordinate system. The outline 231 may be of a rectangle, circle, square, substantially convex polygon, and the like, and positions of the calibration targets may deviate slightly from the outline 231 towards interior and exterior areas with respect to the outline 231. In FIG. 5, 16-point calibration grid 230 has a set of calibration targets $(X_k, Y_k)$ configured in a rectangular-shaped outline 231. The outline 231 may be, but is not necessarily, proximate to the perimeter 238 of the touch area 190 of the touchscreen 158 of FIG. 2. No calibration targets are located within an interior area 239 with respect to the outline 231. In other words, the interior area 239 is free of calibration targets. A first calibration target 232 corresponds to display coordinates $(X_1, Y_1)$, a second calibration target 234 corresponds to display coordinates $(X_2, Y_2)$, and a sixteenth calibration target 236 corresponds to display coordinates $(X_{16}, Y_{16})$. Conventional general fits are very unreliable for calibration grids that do not have interior points. In contrast generalized Laplace-constrained fits perform well with perimeter-only calibration grids used with either linear or non-linear types of touchscreens 158. This is an example of the use of the generalized Laplace-constrained fit to reduce the number of calibration targets, while at the same time maintaining or improving the performance of the calibration process.

The outline 231 is not limited to a predetermined form, such as a circle or rectangle. In one embodiment, an inscribed circle 240 may be positioned within all calibration targets. In other words, the inscribed circle 240 is the largest centered circle whose interior contains no calibration targets. A center 242 of the inscribed circle 240 may be the same as a center of the display coordinate system and/or the touchscreen. Radius 244 extends from the center 242 to the inscribed circle 240. With respect to the outline 231, each of the calibration targets in the grid 230 are a distance away from a furthest closest neighboring calibration target that is less than the radius 244. For example, the first and second calibration targets 232 and 234 and the first and sixteenth calibration target 232 and 236 are separated by a distance that is less than the radius 244.

Calibration grids other than the 16-point calibration grid 230 may be used. For example, a minimum of 6 calibration targets may be arranged in the display coordinate system to form an outline of a substantially convex polygon, namely, a polygon whose interior angles are all less than 180 degrees. Deviations from the substantially convex polygon are contemplated, and thus the arrangement of the calibration targets is not limited. In addition, the calibration targets may be positioned in the outline 231 in a relatively central location within the plane of the display coordinate system or may be positioned closer or away from one or more sides of the display coordinate system.

Referring again to 202 of FIG. 3, and initially focusing on Laplace-constrained fits that are a subset of the generalized Laplace-constrained fit, the physical and mathematical basis of the Laplace-constrained expansions will be discussed in terms of a 5-wire resistive touchscreen 158. However, other types of touchscreens, such as a 9-wire resistive touchscreen or a capacitive touchscreen may be used as well. The resistive coating on the glass substrate of a 5-wire resistive touchscreen is a continuous resistive network. Despite being a continuous network, Ohm's Law and Kirchhoff's Junction Rule of electronics still apply.

Ohm's Law is typically expressed as "voltage equals current times resistance". However, as is well known, for a resistive coating Ohm's Law takes the vector calculus form "voltage gradient equals minus current density times resistivity" (or equivalently "current density equals conductivity times the electric field" where conductivity is the inverse of resistivity and the electric field is minus the voltage gradient). Thus, in symbolic form, Ohm's Law for a continuous resistive coating takes the form $-\nabla V = \rho J$ where the 2-D vector $\nabla$ is the gradient operator $(\partial/\partial X, \partial/\partial Y)$ and the 2-D vector J is the surface current density $(J_x, J_y)$.

Kirchhoff's Junction Rule states that the sum of currents entering an electrical junction equals the sum of currents exiting the electrical junction. Kirchhoff's rule is a statement of charge conservation for steady state currents. Applied to a continuous resistive coating, charge conservation for steady state currents is expressed as "the divergence of current density is zero." In the notation of vector calculus, this is symbolically stated as $\nabla \cdot J = 0$.

Kirchhoff's Junction Rule in the form $\nabla \cdot J=0$ may be combined with Ohm's Law in the form $-\nabla V=\rho J$ as follows. Taking the divergence of both sides of Ohm's Law results in $-\nabla^2 V=-\nabla \cdot \nabla V=\nabla \cdot (\rho J)=(\nabla \rho) \cdot J+\rho(\nabla \cdot J)$ where the Laplacian operator $\nabla^2$ is equal to $\partial^2/\partial X^2+\partial^2/\partial Y^2$. By applying charge conservation $\nabla \cdot J=0$, this reduces to $-\nabla^2 V=(\nabla \rho) \cdot J$ and becomes Eq. 13 after again using Ohm's Law in the form $J=-(\nabla V)/\rho$.

$$\nabla^2 V = \{(\nabla \rho)/\rho\} \cdot \nabla V \qquad \text{Eq. 13}$$

If the resistive coating is uniform, then the resistivity gradient $\nabla \rho$ is zero and Eq. 13 reduces differential equation, Eq. 14, which is known as Laplace's Equation. This is true for both X gradient and Y gradient excitations.

$$\nabla^2 V = \partial^2 V/\partial X^2 + \partial^2 V/\partial Y^2 = 0 \qquad \text{Eq. 14}$$

Let x(X,Y) be the raw (uncorrected) x coordinate as a function of display coordinates (X,Y) from the 5-wire touchscreen. Within possible offset and scaling factors, x(X,Y) is the voltage for an X excitation on the glass substrate's resistive surface as a function of position. Hence x(X,Y) must satisfy Laplace's Equation. For similar reasons, the raw y touchscreen coordinate y(X,Y) also satisfies Laplace's Equation.

$$\nabla^2 x(X,Y) = \partial^2 x/\partial X^2 + \partial^2 x/\partial Y^2 = 0 \qquad \text{Eq. 15}$$

$$\nabla^2 y(X,Y) = \partial^2 y/\partial X^2 + \partial^2 y/\partial Y^2 = 0 \qquad \text{Eq. 16}$$

Therefore, at 202 of FIG. 3, the number of fit parameters may be greatly reduced by considering only expansions of touchscreen coordinates (x,y) in terms of display coordinates (X,Y) that satisfy at least one of Eq. 15 and 16 and hence also satisfy the laws of physics (Ohm's Law and Kirchhoff's Junction Rule) for current flow through uniform resistive coatings. In other words, the Laplacian of at least one of the x and y touchscreen coordinates with respect to the display coordinates (X,Y) is smaller than an average magnitude of a Laplacian of a one-to-one correspondence computed with the conventional general fit, especially for noisy touchscreen coordinate data.

It can be verified that each term of the above Laplace expansion $x=\alpha_{X,0} \cdot 1 + \alpha_{X,1} X + \beta_{X,1} \cdot Y + \alpha_{X,2} \cdot (X^2 - Y^2) + \ldots + \beta_{X,3} \cdot (3XY^2 - Y^3)$ satisfies Laplace's Equation. For example the Laplacian of the fourth term $(X^2 - Y^2)$ is zero, that is $\nabla^2(X^2 - Y^2) = \nabla^2 X^2 - \nabla^2 Y^2 = 2 - 2 = 0$. For higher order Laplace expansions, it is convenient to have a systematic method for finding terms that satisfy Laplace's Equation. This can be done by using the complex number notation $Z=X+iY$ and observing that $1=\text{Re}\{Z^0\}$, $X=\text{Re}\{Z^1\}$, $Y=\text{Im}\{Z^1\}$, $(X^2-Y^2)=\text{Re}\{Z^2\}$, $2XY=\text{Im}\{Z^2\}$, $(X^3-3X^2Y)=\text{Re}\{Z^3\}$ and $(3XY^2-Y^3)=\text{Im}\{Z^3\}$. For example $Z^2=(X+iY)^2=(X^2-Y^2)+i \cdot 2XY$ which has a real component of $(X^2-Y^2)$ and an imaginary component of 2XY. Thus for N=3, the above Laplace-constrained expansions for 202 of FIG. 3 can be rewritten as follows.

$$x = \sum_{n=0}^{N} \alpha_{X,n} \cdot \text{Re}\{(X+iY)^n\} + \sum_{n=1}^{N} \beta_{X,n} \cdot \text{Im}\{(X+iY)^n\} \qquad \text{Eq. 17}$$

$$y = \sum_{n=0}^{N} \alpha_{Y,n} \cdot \text{Re}\{(X+iY)^n\} + \sum_{n=1}^{N} \beta_{Y,n} \cdot \text{Im}\{(X+iY)^n\} \qquad \text{Eq. 18}$$

Eq. 17 and 18 represent Laplace-constrained polynomial expansions to any order N. For example, Laplace-constrained expansions to fifth order include the terms proportional to the fifth order polynomials $\text{Re}\{Z^5\}=(X^5-10 \cdot X^3Y^2+5 \cdot XY^4)$ and $\text{Im}\{Z^5\}=(5 \cdot X^4Y-10 \cdot X^2Y^3+Y^5)$. In another embodiment, the above polynomial expansions may be altered, for example, by replacing the basis polynomials $\text{Re}\{(X+iY)^n\}$ and $\text{Im}\{(X+iY)^n\}$ with various linear combinations of these basis polynomials.

In another embodiment, the Laplace constrained polynomial Eq. 17 and 18 may be rewritten in polar coordinates with radius R and polar angle $\phi$ as shown in Eq. 19 and 20. In polar coordinates $Z=(X+iY)=R \cdot e^{i\phi}$ and hence $Z^n=(X+iY)^n=R^n \cdot e^{in\phi}$ so that $\text{Re}\{Z^n\}=R^n \cdot \cos(n\phi)$ and $\text{Im}\{Z^n\}=R^n \cdot \sin(n\phi)$.

$$x = \sum_{n=0}^{N} \alpha_{X,n} \cdot R^n \cdot \cos(n\phi) + \sum_{n=1}^{N} \beta_{X,n} \cdot R^n \cdot \sin(n\phi) \qquad \text{Eq. 19}$$

$$y = \sum_{n=0}^{N} \alpha_{Y,n} \cdot R^n \cdot \cos(n\phi) + \sum_{n=1}^{N} \beta_{Y,n} \cdot R^n \cdot \sin(n\phi) \qquad \text{Eq. 20}$$

The fit parameters $\alpha_{X,n}$ and $\beta_{X,n}$ are thus interpreted as the Fourier series coefficients of the X excitation potential $x(R,\phi)=V(R,\phi)$ on the perimeter of a circle of unit radius centered on the origin.

Figure 6:
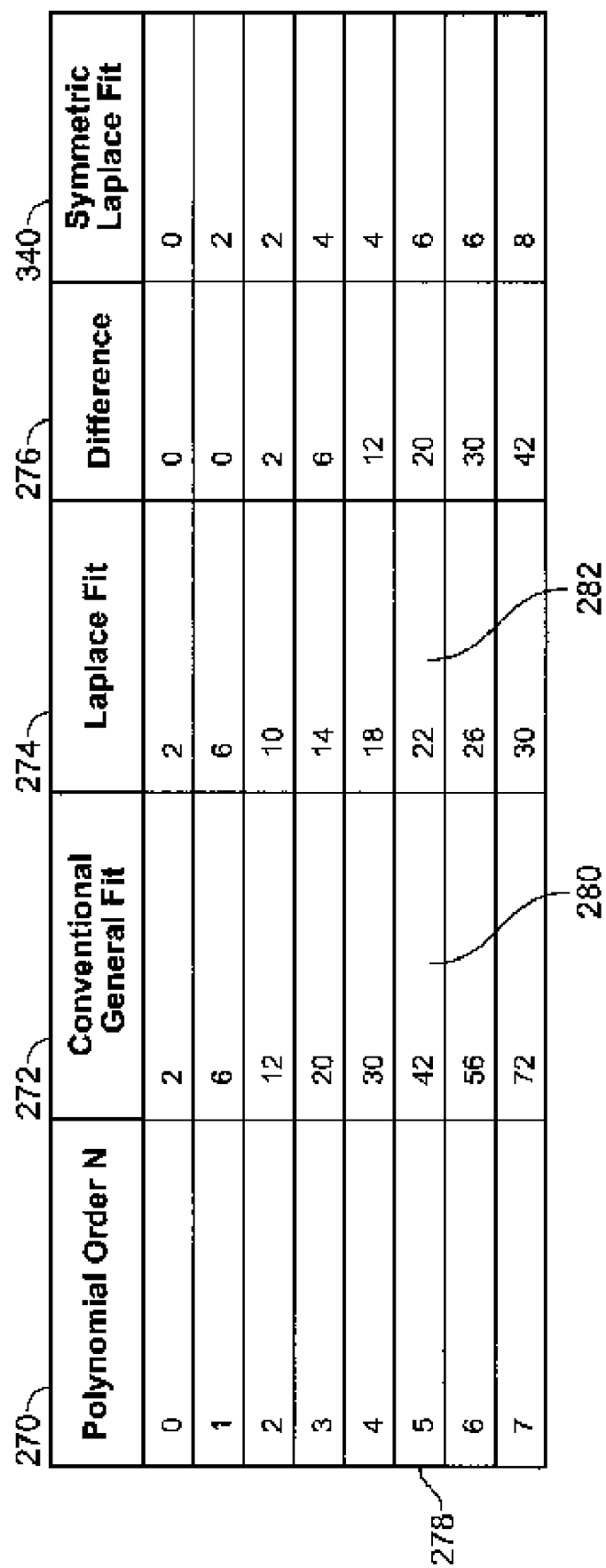
FIG. 6 illustrates a table comparing a total number of fit parameters for conventional general fits and Laplace-constrained fits in accordance with an embodiment of the present invention.

FIG. 6 compares the total number of fit parameters for conventional general fits and Laplace-constrained fits as a function of the order N of the polynomial fit. Column 270 is the polynomial order N, column 272 is the number of fit parameters for the associated polynomial order for the conventional general polynomial fit, column 274 is the number of fit parameters of the associated polynomial order for the Laplace-constrained fit, and column 276 is the difference in the number of fit parameters between the conventional general fit (column 272) and Laplace-constrained fit (column 274), or the number of fit parameters that are eliminated. Column 340 is the number of fit parameters for the associated polynomial order for a symmetric Laplace-constrained fit that is discussed further below.

Because the number of conventional general fit parameters (column 272) grows quadratically with N, equaling (N+2)(N+1), while the number of Laplace-constrained fit parameters (column 274) grows only linearly with N, equaling (4N+2), the relative advantage of the Laplace-constrained fit increases with increasing polynomial order N (column 270). For example, for a fifth order expansion 278, the Laplace-constrained fit reduces the number of fit parameters by about a factor of 2, from forty-two conventional general fit parameters 280 to twenty-two Laplace-constrained fit parameters 282. If the Laplace-constrained fit is generalized to account for possible non-uniformities in the resistive coating, additional fit parameters are introduced, and hence the numbers in columns 274 and 340 become lower limits and the difference numbers in column 276 become upper limits. However, as long as the number of additional parameters is small, the fit redundancy advantages of Laplace-constrained fits are largely retained.

Because of noise in data, the conventional general fit will produce non-zero values for correction parameters that violate the laws of physics and give distortions that are not present in the touchscreen 158. In other words, the one-to-one correspondence computed with a conventional general fit will result in larger values compared to the one-to-one correspondence computed where a Laplacian of at least one of the x and y touchscreen coordinates is small, zero or substantially zero (see Eq. 15 and 16). The Laplace-constrained fit prevents noise and errors in the data from generating coefficients that are not allowed to be there by the laws of physics. Therefore, the 3$^{rd}$ order fit results in a better fit because there is a higher level of redundancy. Also, the seventh order fit may be accomplished with a generalized Laplace-constrained fit but not with the conventional general fit to 25-point calibration data.

In one embodiment, only terms satisfying Laplace's equation are allowed in the expansion at 202 of FIG. 3. However, in another embodiment, some, but not all, fit parameters corresponding to terms that violate Laplace's Equation may be allowed. In other words, one or more conventional general fit parameters from the column 272 that are not included within the Laplace-constrained fit parameters of column 274 may be used. Any reduction of fit parameters with the use of Laplace's equation provides benefits; however, in some cases it may be advantageous to include one or more terms that violate Laplace's equation.

As discussed previously, Laplace's equation results from the assumption that the resistivity of the coating (e.g. ITO) is uniform, that is, the resistivity gradient $\nabla\rho$ is zero. Now the possibility of a small but non-zero resistivity gradient is considered, particularly, a small and uniform gradient of unknown direction and magnitude. One example of a non-uniform gradient is a gradual change in resistivity from one side of the touchscreen 158 to the other. For example, the ITO coating may gradually become more resistive when going from the left to right across the touch area 190. In this case the laws of physics lead to the equation $\nabla^2 V = \{(\nabla\rho)/\rho\} \cdot \nabla V \neq 0$. The deviation from Laplace's equation $\nabla^2 V = 0$ is proportional to the magnitude of the resistivity gradient. In the case that the touchscreen 158 is close to being linear, the quantity $\{(\nabla\rho)/\rho\} \cdot \nabla V$ may be estimated to a first approximation. For the X excitation of an approximately linear touchscreen 158, the voltage gradient is dominated by the linear term in the polynomial expansion and $\nabla V = \nabla x \approx (\alpha_{X,1}, 0)$. Likewise, the estimate $\nabla V = \nabla y \approx (0, \beta_{Y,1})$ may be used for the Y excitation. Hence for the X excitation $\{(\nabla\rho)/\rho\} \cdot \nabla V \approx \alpha_{X,1} \cdot (1/\rho) \cdot \partial\rho/\partial X$ and for Y excitation $\{(\nabla\rho)/\rho\} \cdot \nabla V \approx \beta_{Y,1} \cdot (1/\rho) \cdot \partial\rho/\partial Y$. Thus, to a better approximation than Laplace's equation, applying the laws of physics leads to Eq. 21 and 22 that take into account a resistive coating non-uniformity in the form of a resistivity gradient.

$$\nabla^2 x \approx \alpha_{X,1} \cdot (1/\rho) \cdot \partial\rho/\partial X \qquad \text{Eq. 21}$$

$$\nabla^2 y \approx \beta_{Y,1} \cdot (1/\rho) \cdot \partial\rho/\partial Y \qquad \text{Eq. 22}$$

Eq. 21 and 22 result in the introduction of a new polynomial term $\gamma_X \cdot X^2/2$ to the x expansion and a new polynomial term $\gamma_Y \cdot Y^2/2$ to the y expansion, respectively. The fit will tend to adjust the new fit parameters $\gamma_X$ and $\gamma_Y$ to the values $\alpha_{X,1} \cdot (1/\rho) \partial\rho/\partial X$ and $\beta_{Y,1} \cdot (1/\rho) \partial\rho/\partial Y$, respectively, as the true voltage gradients satisfy the above equations better than Laplace's equation. By adding two parameters to accommodate for non-uniformities in resistivity, some of the redundancy of the fit is lost. Nevertheless, this modification of a Laplace-constrained fit results in a generalized Laplace-constrained fit that provides more fit redundancy than a conventional general fit. For example, for a 3$^{rd}$ order fit, the modified Laplace expansion (Eq. 21 and 22) has 16 parameters (two more parameters in comparison with the Laplace-constrained fit). This is a significant reduction with respect to the 20 parameters of a conventional general fit to 3$^{rd}$ order. Eq. 23 and 24 are modifications of Eq. 17 and 18, respectively, accounting for the additional terms accommodating resistive coating non-uniformities as discussed.

$$x = \sum_{n=0}^{N} \alpha_{X,n} \cdot \text{Re}\{(X+iY)^n\} + \sum_{n=1}^{N} \beta_{X,n} \cdot \text{Im}\{(X+iY)^n\} + \gamma_X \cdot X^2/2 \qquad \text{Eq. 23}$$

$$y = \sum_{n=0}^{N} \alpha_{Y,n} \cdot \text{Re}\{(X+iY)^n\} + \sum_{n=1}^{N} \beta_{Y,n} \cdot \text{Im}\{(X+iY)^n\} + \gamma_Y \cdot Y^2/2 \qquad \text{Eq. 24}$$

While the expressions of Equations 23 and 24 violate Laplace's equation for small values of $\gamma_X$ and $\gamma_Y$ corresponding to mild resistivity gradients, the degree of violation is small compared to that of the relation between touchscreen and display coordinates provided by a conventional general fit. The degree of violation of Laplace's equation is quantified by averaging the magnitude of the Laplacian over display coordinates (X,Y) corresponding to the touch sensitive area of the touchscreen. If the touch sensitive area of the touchscreen corresponds to (X,Y) coordinates in the ranges Xmin<X<Xmax and Ymin<Y<Ymax, then the average magnitude of the Laplacian of the touchscreen x coordinate may be computed with the following double integral expressions or suitable approximations as double sums.

$$\int_{Xmin}^{Xmax} \int_{Ymin}^{Ymax} |\nabla^2 x(X,Y)| \qquad \text{Eq. 25}$$
$$dX/(X\max - X\min)dY/(Y\max - Y\min)$$

$$\int_{Xmin}^{Xmax} \int_{Ymin}^{Ymax} |\nabla^2 y(X,Y)| \qquad \text{Eq. 26}$$
$$dX/(X\max - X\min)dY/(Y\max - Y\min)$$

In Eq. 25 and 26, $\nabla^2 x(X,Y) = \partial x/\partial X^2 + \partial^2 x/\partial Y^2$ and $\nabla^2 y(X,Y) = \nabla^2 y/\partial X^2 + \partial^2 y/\partial Y^2$. In the case that $x(X,Y)$ and $y(X,Y)$ are given by Equations 23 and 24 above, the expressions of Eq. 25 and 26 for average magnitudes of the Laplacian are evaluated to be simply $\gamma_X$ and $\gamma_Y$ respectively and typically less than 10% of corresponding average magnitudes of the Laplacian for a convention general fit.

Laplace's equation and the analysis above assumes that the display coordinates system of the display screen 156 is a Cartesian coordinate system. This is the case if X and Y are measured in units of pixels and the pixel pitch (e.g. 0.27 mm) is the same in the vertical and horizontal directions. However, in one embodiment non-Cartesian coordinate systems may be used, such as in programming, in which X and Y coordinates are scaled differently. This is the case, for example, X and Y may be scaled to the same two-byte signed integer range from −32,768 to +32,767 even when the display height to width aspect ratio is 3:4. The above equations may thus be modified for the case of non-Cartesian display coordinates, wherein the non-Cartesian display coordinates are indicated as (X',Y'). Let $S_X$ and $S_Y$ be scaling factors between non-Cartesian coordinates (X',Y') and some Cartesian display coordinates (X,Y) such that $X = S_X \cdot X'$ and $Y = S_Y \cdot Y'$. The substitutions $X \rightarrow S_X \cdot X'$ and $Y \rightarrow S_Y \cdot Y'$ may be made into the above equations and the laws of physics remain satisfied.

In terms of the non-Cartesian coordinates (X',Y'), the Laplacian expressions can be written as $\nabla^2 x(X',Y') = (1/S_X^2) * \partial^2 x/\partial X'^2 + (1/S_Y^2) * \partial^2 x/\partial Y'^2$ and $\nabla^2 y(X',Y') = (1/S_X^2) * \partial^2 y/\partial X'^2 + (1/S_Y^2) * \partial^2 y/Y'^2$. As is well know in mathematical physics, the Laplacian can similarly be generalized to a number of coordinate systems, i.e. curvilinear coordinate systems that are not Cartesian.

The origin of the (Cartesian) display coordinate system also needs to be determined. The above derivations are correct regardless of the location of the origin. In varying embodiments, the point (X,Y)=(0,0) may be the center of the display screen 156, the lower left corner of the display screen 156 or anywhere else in the plane of the display screen 156. In practice, an origin close to or at the center of the display screen 156 may be desirable as the polynomial expansions converge much faster with the origin being near the symmetry point of the display screen 156 and touch area 190 of the touchscreen 158. Because the finite number of calibration targets supports polynomial expansions of only limited orders, rapid convergence is desired and may be achieved by centering at or near the origin. Likewise, it is generally advantageous for polynomial expansions to have a centered origin for the touchscreen coordinates (x,y). However, it is not necessary for the origin to be centered.

Due to symmetries in the design of touch display system 150, many of the coefficients in fitted Laplace expansions such as $x=\alpha_{X,0}\cdot 1+\alpha_{X,1}\cdot X+\beta_{X,1}\cdot Y+\alpha_{X,2}\cdot(X^2-Y^2)+\ldots+\beta_{X,3}\cdot(3XY^2-Y^3)$ tend to be small. Symmetries may be left/right symmetries or top/bottom symmetries, for example. If manufacturing variations are sufficiently small, the symmetries may allow elimination of one, several or many terms from the polynomial expansions. One example of symmetries is the case when manufacturing variations are nearly or completely negligible.

Figure 7:
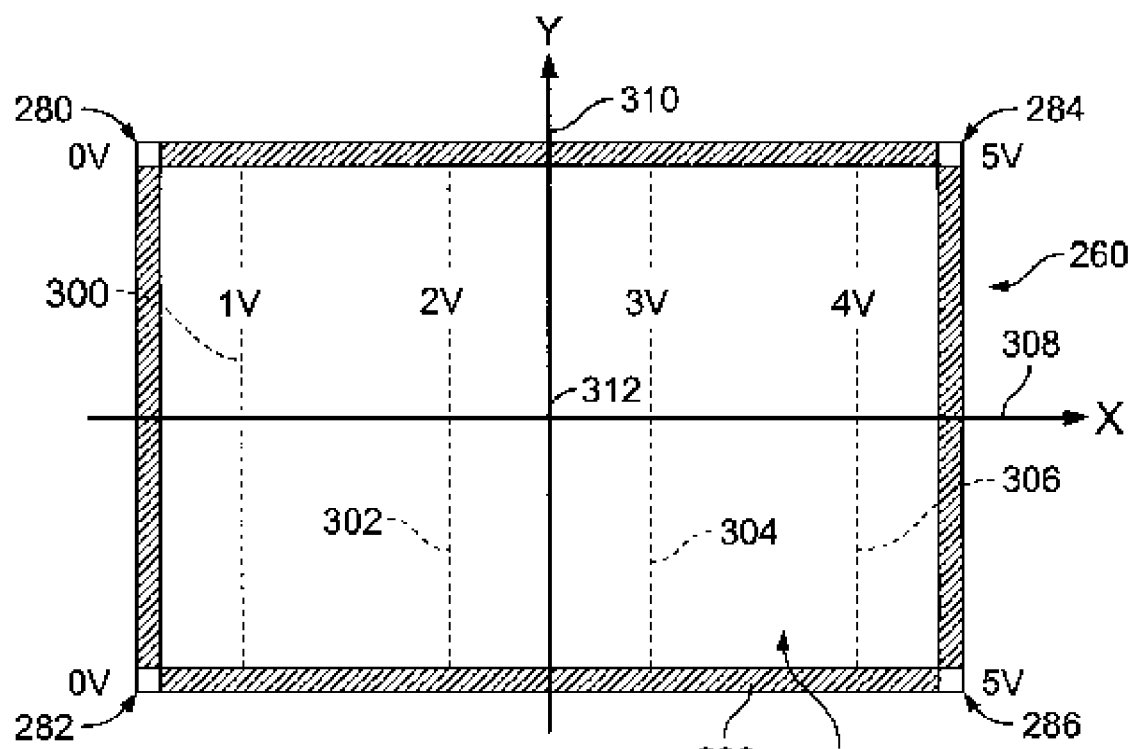
FIG. 7 illustrates a first X excitation field map for a symmetric and linear touchscreen formed in accordance with an embodiment of the present invention.
Figure 8:
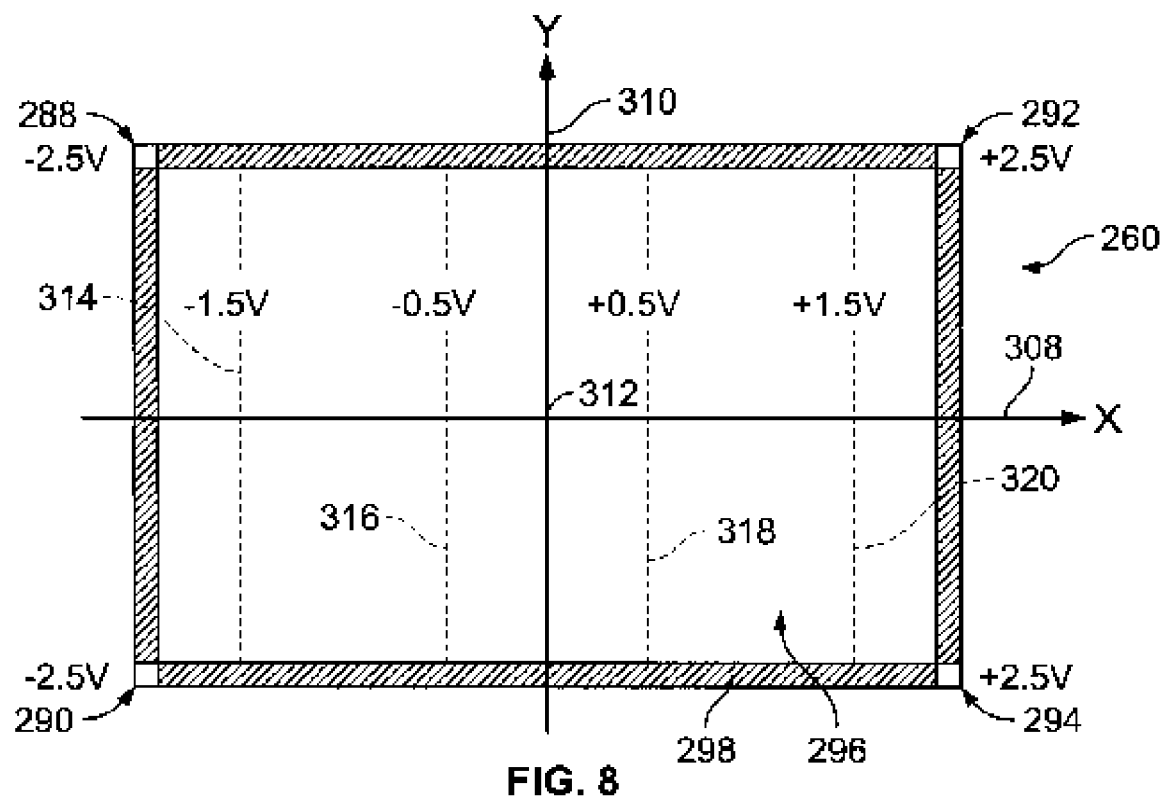
FIG. 8 illustrates a second X excitation field map for a symmetric and linear touchscreen formed in accordance with an embodiment of the present invention.

FIGS. 7 and 8 consider X excitation field maps for the case of an ideal symmetric and perfectly linear touchscreen 260. Both FIGS. 7 and 8 represent the same touchscreen 260 with the same voltage excitation of the resistive coating on the glass substrate. At the four corners of the touchscreen 260 are written the excitation voltages asserted by associated touchscreen controller electronics (not shown). In FIG. 7, the corners are indicated as top left corner 280, bottom left corner 282, top right corner 284, and bottom right corner 286. In FIG. 8, the corners are indicated as top left corner 288, bottom left corner 290, top right corner 292, and bottom right corner 294.

In FIG. 7, touchscreen ground or zero volts is defined by the analog circuit ground of the controller electronics so that the top and bottom left corners 280 and 282 are grounded to zero volts and the top and bottom right corners 284 and 286 are powered at a voltage level, in this case, 5 volts. The touchscreen 260 has a touch area 296 surrounded by perimeter electrodes 298 that are schematically shown by shading. Dotted lines 300, 302, 304 and 306 represent lines of constant voltage of 1 volts, 2 volts, 3 volts and 4 volts, respectively, resulting from the X excitation. In addition, X axis 308 and Y axis 310 represent a display coordinate system whose origin 312 is centered on the display screen 156 (not shown). In this example, it is assumed that the touch area 296 and perimeter electrodes 298 of the touchscreen 260 are symmetric in design and manufacture as well as being perfectly aligned with respect to the display screen 156.

In FIG. 7 the voltage at the origin 312, wherein (X,Y)=(0, 0), is 2.5 volts as the origin 312 is located midway between lines 302 and 304. Turning to FIG. 8, ground or zero volts is defined as the voltage at the origin 312. With this definition of ground for FIG. 8, the top and bottom left corners 288 and 290 are excited with −2.5 volts, the top and bottom right corners 292 and 294 are excited with +2.5 volts, and lines of constant voltage, lines 314, 316, 318 and 320, correspond to −1.5 volts, −0.5 volts, +0.5 volts and +1.5 volts, respectively. The raw touchscreen coordinate x=x(X,Y) is defined to be the local resistive coating voltage as defined in FIG. 8. By avoiding artificial asymmetries in the coordinate system definitions and ground definition, symmetries of the hardware become more apparent. In general, the electrostatic potential x(X,Y) for the X excitation of touchscreen 260 in FIG. 8 is anti-symmetric in X and symmetric in Y. In particular, the horizontal touchscreen coordinate x is an anti-symmetric function of the horizontal display coordinate X:

$$x(-X,Y)=-x(X,Y) \qquad \text{Eq. 27}$$

and at the same time a symmetric function of vertical display coordinate Y:

$$x(X,-Y)=+x(X,Y) \qquad \text{Eq. 28}$$

In a similar fashion, for perfectly symmetric touch display hardware, the vertical touchscreen coordinate y satisfies the symmetry relations:

$$y(-X,Y)=+y(X,Y) \qquad \text{Eq. 29}$$

$$y(X,-Y)=-y(X,Y) \qquad \text{Eq. 30}$$

Figure 9:
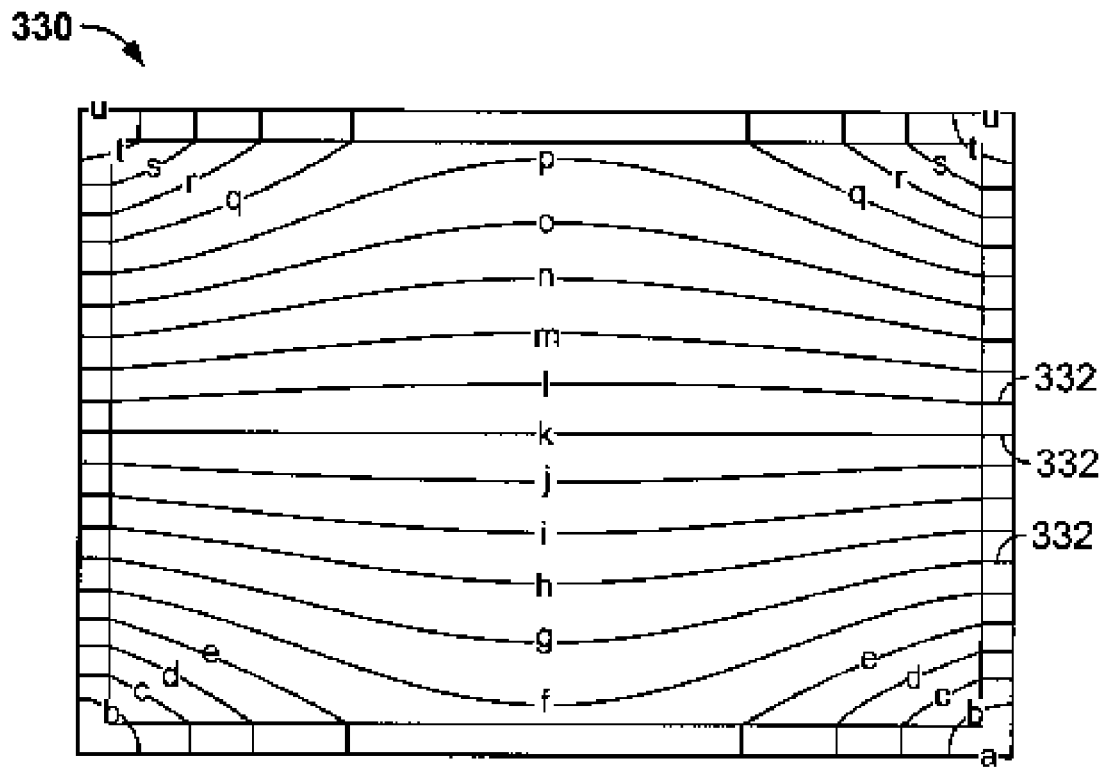
FIG. 9 illustrates an example of a picture-frame touchscreen that is symmetrically designed and manufactured with tight manufacturing tolerances in accordance with an embodiment of the present invention.

The above symmetry relations also apply to non-linear touchscreens 158 provided that the touch display system 150 is still symmetric. FIG. 9 illustrates an example of a picture-frame touchscreen 330 that is symmetrically designed and manufactured with tight manufacturing tolerances. For example, a (simulated) Y-excitation shown using multiple lines of constant potential 332 satisfies the above symmetry relations. Another example is a nominally linear touchscreen (not shown) that has a slight symmetric pin-cushion distortion due to manufacturing variations. When the touchscreen design and the nature of anticipated manufacturing variations preserve the symmetries, the above symmetry relations provide an opportunity to further reduce the number of fit parameters.

With the above symmetry relations in mind, consider again the Laplace expansions of, for example, Eq. 9 and 10. Many terms in the expansion $x=\alpha_{X,0}\cdot 1+\alpha_{X,1}\cdot X+\beta_{X,1}\cdot Y+\alpha_{X,2}\cdot(X^2-Y^2)+\ldots+\beta_{X,3}\cdot(3XY^2-Y^3)$ violate the symmetry relations of Eq. 27 and 28. The terms $\alpha_{X,0}\cdot 1$, $\beta_{X,1}\cdot Y$, $\alpha_{X,2}\cdot(X^2-Y^2)$ and $\beta_{X,3}\cdot(3X^2Y-Y^3)$ are horizontally symmetric in the sense that they are unaffected by the replacement X→−X. These terms are not horizontally anti-symmetric as required by the symmetry relation $x(-X,Y)=-x(X,Y)$. Thus, in one embodiment, the coefficients $\alpha_{X,0}$, $\beta_{X,1}$, $\alpha_{X,2}$ and $\beta_{X,3}$ must all be zero. The terms $\beta_{X,1}\cdot Y$, $\beta_{X,2}\cdot 2XY$ and $\beta_{X,3}\cdot(3X^2Y-Y^3)$ are vertically anti-symmetric in violation of the vertical symmetry requirement $x(X,-Y)=x(X,Y)$, and thus the coefficients $\beta_{X,1}$, $\beta_{X,2}$ and $\beta_{X,3}$ must also be zero. Therefore, the complete Laplace expansion of proper symmetry to $3^{rd}$ order is $x=\alpha_{X,1}\cdot X+\alpha_{X,3}\cdot(X^3-3XY^2)$. Symmetry has thus reduced the number of terms from seven to two. Likewise symmetry reduces the generalized Laplace-constrained expansion for the vertical touchscreen coordinate to $y=\beta_{Y,1}\cdot Y+\beta_{Y,3}\cdot(3X^2Y-Y^3)$. The non-zero coefficients for the x expansion only include the $\alpha_{X,n}$ coefficients for odd values of n, such as n=1, 3, 5, . . . . The y expansions only includes $\beta_{Y,n}$ coefficients for odd values of n. Generalizing to an arbitrary order N, Eq. 31 and 32 give the symmetric Laplace expansions.

$$x = \sum_{n\,odd}^{n\leq N} \alpha_{X,n}\cdot \text{Re}\{(X+iY)^n\} \qquad \text{Eq. 31}$$

$$y = \sum_{n\,odd}^{n\leq N} \beta_{Y,n}\cdot \text{Im}\{(X+iY)^n\} \qquad \text{Eq. 32}$$

In another example, Eq. 33 and 34 may be used for a $7^{th}$ order expansion (N=7).

$$x = \alpha_{X,1} \cdot X + \alpha_{X,3} \cdot (X^3 - 3XY^2) + \alpha_{X,5} \cdot (X^5 - 10X^3Y^2 + 5XY^4) + \alpha_{X,7} \cdot (X^7 - 21X^5Y^2 + 35X^3Y^4 - 7XY^6)$$ Eq. 33

$$y = \beta_{Y,1} \cdot Y + \beta_{Y,3} \cdot (3X^2Y - Y^3) + \beta_{Y,5} \cdot (5X^4Y - 10X^2Y^3 + Y^5) + \beta_{Y,7} \cdot (7X^6Y - 35X^4Y^3 + 21X^2Y^5 - Y^7)$$ Eq. 34

One or more constants may be added to Eq. 31, 32, 33 and 34, for example, to account for an asymmetric ground definition as is shown in FIG. 7.

Returning to FIG. 6, column 340 is the number of fit parameters for the associated polynomial order for a symmetric Laplace-constrained fit. Even compared to the number of fit parameters of the Laplace-constrained fit shown in column 274, the symmetric Laplace-constrained fit dramatically reduces the number of fit parameters.

In another embodiment, the touch display system 150 may be constructed in a symmetric fashion, but a slight offset exists between the center of the touchscreen 158 and the center of the display screen 156. This may occur due to a registration error when the touchscreen 158 is mounted onto the display screen 156. Also, even if the touch display hardware is perfectly symmetric, if the user does not view the touch display 100 from an angle perpendicular to the plane of the display screen 156 (such as when the calibration data is collected at 200 of FIG. 3), parallax effects will cause an offset between the true center of the touchscreen 158 and the point on the touchscreen 158 that appears to be in front of the center of the display screen 156. For example, let $(X_0, Y_0)$ be the display coordinates of the display image pixel that is perceived by the user to be directly below the exact center of the touch area 190 of the touchscreen 158.

Eq. 35 and 36 extend the symmetric Laplace-constrained fit (Eq. 31 and 32) to the case of a non-zero touchscreen-display offset $(X_0, Y_0)$. This is one example of a quasi-symmetric Laplace-constrained fit. The quasi-symmetric Laplace-constrained fit assumes that the touchscreen 158 is perfectly symmetric but may be asymmetrically mounted on the touch display 154. In the fitting process, the coordinate offsets $X_0$ and $Y_0$ are regarded as unknown parameters to be determined by the fit. The addition of two more fit parameters somewhat reduces the redundancy of the symmetric Laplace-constrained fit. Nevertheless, the quasi-symmetric Laplace-constrained fit of Eq. 35 and 36 has a greatly reduced number of fit parameters than both the generalized Laplace-constrained fit and the conventional general fit.

$$x = \sum_{n \, odd}^{n \leq N} \alpha_{X,n} \cdot \text{Re}\{[(X - X_0) + i(Y - Y_0)]^n\}$$ Eq. 35

$$y = \sum_{n \, odd}^{n \leq N} \beta_{Y,n} \cdot \text{Im}\{[(X - X_0) + i(Y - Y_0)]^n\}$$ Eq. 36

For the specific case of a $3^{rd}$ order expansion, Eq. 35 and 36 reduce to the explicit equations $x = \alpha_{X,1} \cdot (X - X_0) + \alpha_{X,3} \cdot \{(X - X_0)^3 - 3 \cdot (X - X_0) \cdot (Y - Y_0)^2\}$ and $y = \beta_{Y,1} \cdot (Y - Y_0) + \beta_{Y,3} \cdot \{3 \cdot (X - X_0)^2 \cdot (Y - Y_0) - (Y - Y_0)^3\}$, respectively.

The symmetric Laplace-constrained fit (Eq. 31 and 32) can be modified further to accommodate a possible small rotation of the touchscreen relative to the display. In some cases, the small rotation may be a result of manufacturing and/or assembly and may not affect the end-user application. However, if the application has tight tolerances, such as small touchscreen buttons that are close together and/or a small touchscreen with limited room for display, it may be desirable to compensate for the rotation. Let $\delta\theta$ be the relative rotation between the touchscreen 158 and display screen 156. The $\delta\theta$ may serve as an additional fit parameter, such as in the polynomial expansions of Eq. 37 and 38, with $\exp(-i\delta\theta) = \cos(\delta\theta) - i \cdot \sin(\delta\theta)$. Eq. 37 and 38 also are examples of a quasi-symmetric Laplace-constrained fit. The expressions are evaluated with the usual rules for multiplying complex numbers.

$$x = \sum_{n \, odd}^{n \leq N} \alpha_{X,n} \cdot \text{Re}\{(\exp(-i\delta\theta) \cdot [(X - X_0) + i(Y - Y_0)])^n\}$$ Eq. 37

$$y = \sum_{n \, odd}^{n \leq N} \beta_{Y,n} \cdot \text{Im}\{(\exp(-i\delta\theta) \cdot [(X - X_0) + i(Y - Y_0)])^n\}$$ Eq. 38

The above fit parameters $X_0$, $Y_0$ and $\delta\theta$ enter into Eq. 37 and 38 in a non-linear fashion. This may be a problem for the simplest code for computing least squared fits. However, more powerful fit algorithms are well known that are capable of performing fits based in Eq. 37 and 38.

In Eq. 39 and 40, $\alpha'_{X,n}$ and $\beta'_{Y,n}$ are fit parameters for the symmetric Laplace expansion, $(x',y')$ are intermediate results for the touchscreen coordinates before taking account of any rotations and offset, $x_0$ and $y_0$ are the touchscreen coordinates $(x,y)$ immediately above the $(X,Y)=(0,0)$ display origin, and $\delta\theta'$ is a rotation parameter that is applied to touchscreen coordinates $(x,y)$ rather than the display coordinates $(X,Y)$.

$$x' = \sum_{n \, odd}^{n \leq N} \alpha'_{X,n} \cdot \text{Re}\{(X + iY)^n\}$$ Eq. 39

$$y' = \sum_{n \, odd}^{n \leq N} \beta'_{Y,n} \cdot \text{Im}\{(X + iY)^n\}$$ Eq. 40

Although typically only the display coordinates $(X,Y)$ are Cartesian coordinates that can be offset and rotated in this fashion, if the touchscreen coordinates $(x,y)$ are approximately Cartesian and the values of $\delta\theta'$, $x_0$ and $y_0$ are small, Eq. 41 and 42 may be applied.

$$x = \cos(\delta\theta') \cdot x' - \sin(\delta\theta') \cdot y' + x_0 \approx x' - \delta\theta' \cdot y' + x_0$$ Eq. 41

$$y = \sin(\delta\theta') \cdot x' + \cos(\delta\theta') \cdot y' + y_0 \approx y' + \delta\theta' \cdot x' + y_0$$ Eq. 42

Provided that the calibration grid is both top/bottom and left/right symmetric, the parameters $x_0$ and $y_0$ can be computed as the average of the x and y coordinates of the calibration data. These offsets can be applied to the calibration data, $(x_k, y_k) \rightarrow (x''_k, y''_k) \equiv (x_k - x_0, y_k - y_0)$ to produce centered calibration data. Furthermore, the calibration data $(X''_k, y''_k) \rightarrow (x'_k, y'_k)$ may be made symmetric by defining $x'_k = (x''_k + x''_{k'} - X''_{k''} - x''_{k'''})/4$ and $y'_k = (y''_k - y''_{k'} + y''_{k''} - y''_{k'''})/4$ where indices k', k" and k''' are chosen so that $(X_{k'}, Y_{k'}) = (+X_k, -Y_k)$, $(X_{k''}, Y_{k''}) = (-X_k, +Y_k)$ and $(X_{k'''}, Y_{k'''}) = (-X_k, -Y_k)$. The symmetric Laplace-constrained fit parameters $\alpha'_{X,n}$ and $\beta'_{Y,n}$ are determined by standard least squared fit to the symmetrized calibration data $(x'_k, y'_k)$ while the parameter $\delta\theta'$ may be estimated by Eq. 43 where the sums are over the calibration grid index k.

$$\tan(\delta\theta') \approx \{[\Sigma(x''_k \cdot y'_k - x'_k \cdot y''_k)] / [\Sigma(x''_k \cdot x'_k + y'_k \cdot y''_k)]\}$$ Eq. 43

If the touchscreen coordinates $(x,y)$ are nonlinear, a better estimate for rotation 60' may be obtained with Eq. 44 and 45 where D and D' represent the partial derivative with respect to 60 for the expansions of x and y, respectively, in the quasi-symmetric Laplace-constrained fit (Eq. 37 and 38).

$$\delta\theta' \approx \{[\Sigma D \cdot (x'_k - x''_k)]/\Sigma [D_J^2]\} \quad \text{Eq. 44}$$

$$\delta\theta' \approx \{[\Sigma D' \cdot (y'_k - y''_k)]/\Sigma [D'_J^2]\} \quad \text{Eq. 45}$$

In other embodiments, the above equations can be re-expressed in a number of mathematically equivalent ways. None of the equations herein is limited to one or any particular coordinate system or mathematic notation.

Returning to 204 of FIG. 3, in another embodiment the calibration module 196 may accomplish an analytic conversion, which is a type of inversion. For example, the $3^{rd}$ order symmetric Laplace-constrained fit may be used to illustrate analytic inversion of the Laplace expansion as an alternative to the virtual calibration grid method. The symmetric Laplace expansions $x = \alpha_{X,1} \cdot X + \alpha_{X,3} \cdot (X^3 - 3XY^2)$ and $y = \beta_{Y,1} \cdot Y + \beta_{Y,3} \cdot (3X^2 Y - Y^3)$ may be substituted back into the polynomial expansion given in Eq. 3 and 4 for the horizontal display coordinate X as a function of touchscreen coordinates (x,y). Doing so while keeping only terms up to $3^{rd}$ order leads to Eq. 46.

$$X = A_{0,0} + A_{1,0} \cdot \{\alpha_{X,1} \cdot X + \alpha_{X,3} \cdot (X^3 - 3XY^2)\} + \quad \text{Eq. 46}$$
$$A_{0,1} \cdot \{\beta_{Y,1} \cdot Y + \beta_{Y,3} \cdot (3X^2 Y - Y^3)\} + A_{2,0} \cdot \{\alpha_{X,1} \cdot X\}^2 +$$
$$A_{1,1} \cdot \{\alpha_{X,1} \cdot X\} \cdot \{\beta_{Y,1} \cdot Y\} + A_{0,2} \cdot \{\beta_{Y,1} \cdot Y\}^2 +$$
$$A_{3,0} \cdot \{\alpha_{X,1} \cdot X\}^3 + A_{2,1} \cdot \{\alpha_{X,1} \cdot X\}^2 \{\beta_{Y,1} \cdot Y\} +$$
$$A_{1,2} \cdot \{\alpha_{X,1} \cdot X\} \{\beta_{Y,1} \cdot Y\}^2 + A_{0,3} \cdot \{\beta_{Y,1} \cdot Y\}^3$$

Collecting terms of equal powers of X and Y, Eq. 46 becomes Eq. 47.

$$0 = A_{0,0} + \{A_{1,0} \cdot \alpha_{X,1} - 1\} \cdot X + \{A_{0,1} \cdot \beta_{Y,1}\} \cdot Y + \quad \text{Eq. 47}$$
$$\{A_{2,0} \cdot \alpha_{X,1}^2\} \cdot X^2 + \{A_{1,1} \cdot \alpha_{X,1} \cdot \beta_{Y,1}\} \cdot XY +$$
$$\{A_{0,2} \cdot \beta_{Y,1}^2\} \cdot Y^2 + \{A_{1,0} \cdot \alpha_{X,3} + A_{3,0} \cdot \alpha_{X,1}^3\} \cdot X^3 +$$
$$\{-3 \cdot A_{1,0} \cdot \alpha_{X,3} + A_{2,1} \cdot \alpha_{X,1} \cdot \beta_{Y,1}^2\} \cdot XY^2 +$$
$$\{3 A_{0,1} \cdot \beta_{Y,3} + A_{2,1} \cdot \alpha_{X,1}^2 \cdot \beta_{Y,1}\} \cdot X^2 Y +$$
$$\{-A_{0,1} \cdot \beta_{Y,3} + A_{0,3} \cdot \beta_{Y,1}^3\} \cdot Y^3$$

For Eq. 47 to be true for all possible values of X and Y, the coefficient of each monomial term is to be zero, as shown in Eq. 48 thru 57.

$$0 = A_{0,0} \quad \text{Eq. 48}$$

$$0 = A_{1,0} \cdot \alpha_{X,1} - 1 \quad \text{Eq. 49}$$

$$0 = A_{0,1} \cdot \beta_{Y,1} \quad \text{Eq. 50}$$

$$0 = A_{2,0} \cdot \alpha_{X,1}^2 \quad \text{Eq. 51}$$

$$0 = A_{1,1} \alpha_{X,1} \cdot \beta_{Y,1} \quad \text{Eq. 52}$$

$$0 = A_{0,2} \cdot \beta_{Y,1}^2 \quad \text{Eq. 53}$$

$$0 = A_{1,0} \cdot \alpha_{X,3} + A_{3,0} \cdot \alpha_{X,1}^3 \quad \text{Eq. 54}$$

$$0 = -3 \cdot A_{1,0} \cdot \alpha_{X,3} + A_{1,2} \cdot \alpha_{X,1} \cdot \beta_{Y,1}^2 \quad \text{Eq. 55}$$

$$0 = 3 A_{0,1} \cdot \beta_{Y,3} + A_{2,1} \cdot \alpha_{X,1}^2 \cdot \beta_{Y,1} \quad \text{Eq. 56}$$

$$0 = -A_{0,1} \cdot \beta_{Y,3} + A_{0,3} \cdot \beta_{Y,1}^3 \quad \text{Eq. 57}$$

The ten equations Eq. 48 thru 57 have ten unknowns $A_{0,0}$, $A_{1,0}$, $A_{0,1}$, $A_{2,0}$, ... $A_{0,3}$ that can be solved as follows.

$$A_{1,0} = 1/\alpha_{X,1} \quad \text{Eq. 58}$$

$$A_{3,0} = -\alpha_{X,3}/\alpha_{X,1}^4 \quad \text{Eq. 59}$$

$$A_{1,2} = 3 \cdot \alpha_{X,3}/(\alpha_{X,1}^2 \cdot \beta_{Y,1}^2) \quad \text{Eq. 60}$$

$$A_{0,0} = A_{0,1} = A_{2,0} = A_{1,1} = A_{0,2} = A_{2,1} = A_{0,3} = 0 \quad \text{Eq. 61}$$

Similarly, back substituting into the polynomial expansion for the vertical display coordinate Y, Eq. 62 thru 65 may be obtained.

$$B_{0,1} = 1/\beta_{Y,1} \quad \text{Eq. 62}$$

$$B_{0,3} = -\beta_{Y,3}/\beta_{Y,1}^4 \quad \text{Eq. 63}$$

$$B_{2,1} = 3 \cdot -\beta_{Y,3}/(\beta_{Y,1}^2 \cdot \alpha_{X,1}^2) \quad \text{Eq. 64}$$

$$B_{0,0} = B_{1,0} = B_{2,0} = B_{1,1} = B_{0,2} = B_{1,2} = B_{3,0} = 0 \quad \text{Eq. 65}$$

The only non-zero coefficients are those that correspond to the (inverted) symmetry relations $X(-x,y) = -X(x,y)$, $X(x,-y) = +X(x,y)$, $Y(-x,y) = +Y(x,y)$ and $Y(x,-y) = -Y(x,y)$. Thus, once the Laplace expansion coefficients $\alpha_{X,1}$, $\alpha_{X,3}$, $\beta_{Y,1}$ and $\beta_Y$, are determined at 202 of FIG. 3, the coefficients $A_{m,n}$ and $B_{m,n}$ are easily computed with the above analytic expressions at 204. The same principles may be applied to generalize this analytic method to higher order symmetric Laplace-constrained fits as well as generalized Laplace-constrained fits.

In the examples up to this point, the generalized Laplace-constrained expansions have been polynomial expansions. For computational purposes, polynomial expansions have the advantage of involving only addition and multiplication without recourse to transcendental functions. It can be shown, however, that symmetric expansions Eq. 66 and 67 satisfy Laplace's equation.

$$x = (C_X/k_X) \cdot \sin(k_X \cdot (X - X_0)) \cdot \cos h(k_X \cdot (Y - Y_0)) \quad \text{Eq. 66}$$

$$y = (C_Y/k_Y) \cdot \cos h(k_Y \cdot (X - X_0)) \cdot \sin(k_Y \cdot (Y - Y_0)) \quad \text{Eq. 67}$$

where $C_X$, $k_X$, $C_Y$ and $k_Y$ are fit parameters.

Eq. 66 and 67 reproduce the $3^{rd}$ order terms of the symmetric Laplace polynomial fit (Eq. 31 and 32) for the case of $X_0 = 0$ and $Y_0 = 0$ wherein $k_X$ and $k_Y$ are sufficiently small that only terms up to $2^{nd}$ order is these parameters need be considered, $C_X = \alpha_{X,1}$ and $C_Y = \beta_{Y,1}$ and $C_X \cdot k_X^2/6 = -\alpha_{X,3}$ and $C_Y \cdot k_Y^2/6 = -\beta_{Y,3}$. In other embodiments, other terms corresponding to other products satisfying Laplace's Equation of one trigonometric function and one hyperbolic function, such as $\sin h(k \cdot X) \cdot \cos(k \cdot Y)$, may be included.

Figure 10:
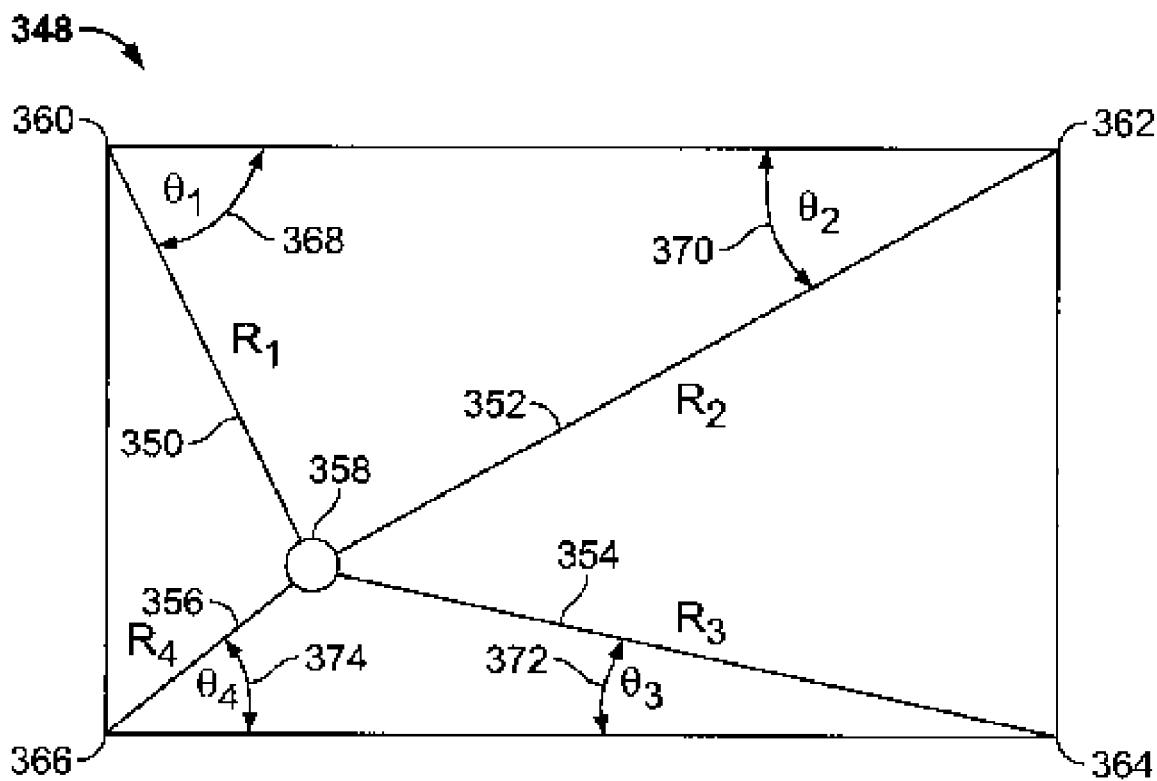
FIG. 10 illustrates a touchscreen having a touch point in accordance with an embodiment of the present invention.

Referring to the Laplace polynomial expansion in polar coordinates, terms of the form $(\alpha_{X,n} \cdot R^n \cdot \cos(n\phi))$ satisfy Laplace's equation not only for integer values of n, but also any real value for n such as $n = \frac{1}{2}$. However, such expressions with non-integral n are no longer $2\pi$ periodic (that is, the expression has different values for 0° and 360°) and hence cannot be used to expand about an origin at the center of the touchscreen 158. However, non-integer values of n are acceptable when expanding about a corner, for example. FIG. 10 illustrates a touchscreen 348 having a touch point 358 in the touch sensitive area of the touchscreen 348. The touchscreen 348 has corners 360, 362, 364 and 366. Radial distances $R_1$ 350, $R_2$ 352, $R_3$ 354, and $R_4$ 356 are the distances to the touch point 358 (in display coordinates) from each of the four corners 360, 362, 364 and 366, respectively. Angles $\theta_1$

368, $\theta_2$ 370, $\theta_3$ 372, and $\theta_4$ 374 are the angles formed between the horizontal edges of the touchscreen 348 and radial distances extending between each of the four corners and the touch point 358. It is assumed that the touch display system hardware is symmetric. In this case, Eq. 68 and 69 provide an alternative parameterization for a Laplace-constrained fit. Such a parameterization involves only the six fit parameters $C_X$, $n_X$, $\theta_X$, $C_Y$, $n_Y$ and $\theta_Y$ and accounts for the somewhat singular behavior at the corner regions of touchscreens such as symmetric picture-frame touchscreens.

$$x = C_{X'}\{+R_1{}^{n_X}\cdot\cos(n_{X'}(\theta_1-\theta_X))-R_2{}^{n_X}\cdot\cos(n_{X'}\theta_2-\theta_X))-R_3{}^{n_X}\cdot\cos(n_{X'}(\theta_3-\theta_X))+R_4{}^{n_X}\cos(n_{X'}(\theta_4-\theta_X))\}$$ Eq. 68

$$y = C_{Y'}\{-R_1{}^{n_y}\cdot\sin(n_{Y'}(\theta_1-\theta_Y))-R_2{}^{n_y}\sin(n_{Y'}(\theta_2-\theta_Y))+R_3{}^{n_y}\sin(n_{Y'}(\theta_3-\theta_Y))+R_4{}^{n_y}\cdot\sin(n_{Y'}(\theta_4-\theta_Y))\}$$ Eq. 69

Therefore, the Laplace-constrained fit may be based on distances from the touch point to each of the four corners of the touchscreen 348 as well as the angle formed by the radial line with the horizontal edge of the touchscreen 348. If $n_X = n_Y = 1$ and $\theta_X = \theta_Y = 0$, then Eq. 68 and 69 reduce to linear touchscreen coordinates $x = \alpha_{X,1} \cdot X$ and $y = \beta_{Y,1} \cdot Y$ with $\alpha_{X,1} = 4C_X$ and $\beta_{Y,1} = 4C_Y$. For quasi-linear picture-frame touchscreens that deviate only slightly from linearity, $n_X$ and $n_Y$ deviate only slightly from one and $\theta_X$ and $\theta_Y$ will by only slightly different than $0°$. For more strongly non-linear picture-frame touchscreen designs, the fitted parameters $n_X$ and $n_Y$ will deviate further from one and $\theta_X$ and $\theta_Y$ may deviate further from zero.

Returning to 204 of FIG. 3, options for inverting Laplace-constrained expansions into expansions of display coordinates (X,Y) in terms of touchscreen coordinates (x,y) include both the virtual grid method as well as use of algebraic expressions or analytic inversion. Other methods may be used to derive expansions of display coordinates (X,Y) in terms of touchscreen coordinates (x,y) from expansions of touchscreen coordinates (x,y) in terms of display coordinates (X,Y). By using one or a combination of types of generalized Laplace-constrained fits, the fit is improved by reducing the number of fit parameters while requiring less calibration targets, and in some touchscreens 158, allowing calibration grids that do not include interior calibration targets, and in some other touchscreens 158, reflecting the symmetry of the touch display hardware.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A method for calibrating a touch system, comprising:
defining a set of calibration targets that have associated display coordinates ($X_i$, $Y_i$) that are in a display coordinate system;
accepting touchscreen coordinates ($x_i$, $y_i$) that have noise, the touchscreen coordinates ($x_i$, $y_i$) each being associated with one of the calibration targets, the touchscreen coordinates being in a touchscreen coordinate system; and
computing non-linear correction parameters for a given polynomial expansion up to an order N (N≧3) that includes a set of polynomial terms based on the touchscreen coordinates ($x_i$, $y_i$) in terms of the display coordinates ($X_i$, $Y_i$), the non-linear correction parameters defining a one-to-one correspondence between display coordinates (X,Y) and touchscreen coordinates (x,y) that is non-linear, the computing comprising producing the one-to-one correspondence by using a linear combination of the polynomial terms to provide polynomial terms within the set that satisfy Laplace's equation and dropping at least some or all correction parameters corresponding to some polynomial terms violating Laplace's equation such that an average magnitude of a Laplacian of at least one of x and y touchscreen coordinates with respect to the display coordinates is smaller than an average magnitude of a Laplacian of a one-to-one correspondence computed with a conventional general fit in the presence of the noise of the touchscreen coordinates ($x_i$, $y_i$), the Laplacians of the x and y touchscreen coordinates being based on $\partial^2 x/\partial X^2 + \partial^2 x/\partial Y^2$ and $\partial^2 y/\partial X^2 + \partial^2 y/\partial Y^2$, respectively.

2. The method of claim 1, wherein the average magnitude of the Laplacian of at least one of the x and y touchscreen coordinates is one of a group of zero and less than 10% of the average magnitude of a Laplacian of a one-to-one correspondence computed with a conventional general fit in the presence of the noise of the touchscreen coordinates ($x_i$, $y_i$).

3. The method of claim 1, wherein the noise is based on at least one of electronic noise and a misalignment between the display coordinates ($X_i$, $Y_i$) of the set of calibration targets and the associated touchscreen coordinates ($x_i$, $y_i$).

4. A computer readable non-transitory medium for calibrating a touch system, comprising:
instructions to detect touch points on a touchscreen, the touch points each being associated with touchscreen coordinates in a touchscreen coordinate system;
instructions to associate each of the touch points with known calibration targets, each of the calibration targets having display coordinates in a display coordinate system, the display coordinate system being associated with at least one of a display screen and an operating system; and
instructions to fit the touchscreen coordinates non-linearly in terms of the display coordinates based on a generalized Laplace-constrained fit, the generalized Laplace-constrained fit being used to identify correction parameters used to map a user generated run-time touch point on the touchscreen to a display coordinate location on a display screen, the correction parameters representing non-linear corrections.

5. The computer readable non-transitory medium of claim 4, further comprising instructions to generate virtual calibration data based on a virtual calibration grid that has more virtual calibration targets than the set of calibration targets, the virtual calibration data being used to compute the correction parameters.

6. The computer readable non-transitory medium of claim 4, the instructions to fit further comprising generating a polynomial expansion based on the display coordinates and the touchscreen coordinates.

7. The computer readable non-transitory medium of claim 4, wherein the calibration targets are located in one of a grid within the display coordinate system, proximate to a perimeter of a touch area associated with the display coordinate system, and an outline within the touch area associated with the display coordinate system.

8. The computer readable non-transitory medium of claim 4, further comprising instructions to generate a polynomial expansion to an Nth order (where $N \geq 3$) based on the display coordinates and the touchscreen coordinates, the polynomial expansion having one polynomial term for every two orders.

9. The computer readable non-transitory medium of claim 4, further comprising instructions to generate a polynomial expansion based on the display coordinates and the touchscreen coordinates, the polynomial expansion further including at least one term that violates Laplace's equation.

10. The computer readable non-transitory medium of claim 9, wherein the at least one term that violates Laplace's equation is based on a non-uniform gradient within the touchscreen.

11. The computer readable non-transitory medium of claim 4, wherein the touchscreen is symmetric in electrostatic potential along at least one of X and Y directions, the medium further comprising:
instructions to generate a polynomial expansion to Nth order based on the display coordinates and the touchscreen coordinates; and
instructions to include polynomial terms within the polynomial expansion having only odd values of n and an optional constant.

12. The computer readable non-transitory medium of claim 4, wherein the touchscreen is symmetric in electrostatic potential along at least one of X and Y directions, the medium further comprising:
instructions to generate a polynomial expansion to Nth order based on the display coordinates and the touchscreen coordinates; and
instructions to modify the polynomial expansion based at least one of a relative rotation and an offset between the touchscreen and the display screen.

13. The computer readable non-transitory medium of claim 4, the touchscreen further comprising horizontal edges along top and bottom sides, the medium further comprising:
instructions to define radial distances $R_1$, $R_2$, $R_3$, and $R_4$ that are distances to display coordinates (X,Y) from each of four corners of the touchscreen;
instructions to define angles $\theta_1$, $\theta_2$, $\theta_3$, and $\theta_4$ that are formed between the horizontal edges and radial lines extending between each of the four corners and the display coordinates (X,Y); and
instructions to perform a Laplace-constrained fit of touch coordinates x and y in terms of the radial distances $R_1$, $R_2$, $R_3$, and $R_4$ and the angles $\theta_1$, $\theta_2$, $\theta_3$, and $\theta_4$.

14. The computer readable non-transitory medium of claim 4, further comprising instructions to store the correction parameters as one of monomial coefficients and constants for a look-up table.

15. The computer readable non-transitory medium of claim 4, wherein the touchscreen is one of a 5-wire resistive touchscreen, a 9-wire resistive touchscreen and a capacitive touchscreen.

16. A computer readable non-transitory medium for calibrating a touch system, comprising:
instructions to detect calibration touch points on a touchscreen, the touch points each being associated with touchscreen coordinates in a touchscreen coordinate system;
instructions to associate each of the touch points with known calibration targets, each of the calibration targets having display coordinates in a display coordinate system that is associated with a display screen, the calibration targets forming an outline in the display coordinate system; and
instructions to fit the touchscreen coordinates non-linearly in terms of the display coordinates, the fit being used to identify correction parameters used to map touch points on the touchscreen to display coordinate locations on the display screen;
the instructions to fit further comprising:
instructions to generate generalized Laplace-constrained expansions to fit the touchscreen coordinates in terms of the display coordinates; and
instructions to invert the generalized Laplace-constrained expansions of the display coordinates in terms of the touchscreen coordinates based on one of a virtual calibration grid and an analytic conversion.

17. The computer readable non-transitory medium of claim 16, wherein the instructions to fit are based on terms that satisfy Laplace's equation.

18. The computer readable non-transitory medium of claim 16, wherein the calibration targets comprise at least six calibration targets.

19. The computer readable non-transitory medium of claim 16, wherein each of the calibration targets forming the outline is separated from a further closest neighboring calibration target by a distance that is less than a radius of a largest inscribed circle centered in the display coordinate system whose interior area is free of calibration targets.

* * * * *